US011703611B2

(12) United States Patent
Zhan et al.

(10) Patent No.: US 11,703,611 B2
(45) Date of Patent: Jul. 18, 2023

(54) COMPUTER-IMPLEMENTED METHOD OF USING A NON-TRANSITORY COMPUTER READABLE MEMORY DEVICE WITH A PRE PROGRAMMED NEURAL NETWORK AND A TRAINED NEURAL NETWORK COMPUTER PROGRAM PRODUCT FOR OBTAINING A TRUE BOREHOLE SIGMA AND A TRUE FORMATION SIGMA

(71) Applicants: China Petroleum & Chemical Corporation, Beijing (CN); Sinopec Tech Houston, Houston, TX (US)

(72) Inventors: Sheng Zhan, Houston, TX (US); Jeremy Zhang, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 114 days.

(21) Appl. No.: 17/476,684

(22) Filed: Sep. 16, 2021

(65) Prior Publication Data
US 2023/0083045 A1   Mar. 16, 2023

(51) Int. Cl.
*G01V 5/14*   (2006.01)
*G01V 5/10*   (2006.01)
(Continued)

(52) U.S. Cl.
CPC ............... *G01V 5/145* (2013.01); *G01V 5/10* (2013.01); *G01V 5/12* (2013.01); *G06F 17/18* (2013.01); *G06N 3/045* (2023.01)

(58) Field of Classification Search
CPC . G01V 5/145; G01V 5/10; G01V 5/12; G06N 3/045; G06F 17/18
See application file for complete search history.

(56) References Cited

U.S. PATENT DOCUMENTS 4,137,450 A   1/1979   Hopkinson
4,409,481 A   10/1983  Smith, Jr.
(Continued)

FOREIGN PATENT DOCUMENTS

EP   0436990 B1   7/1991
GB   2399880 A    9/2004

OTHER PUBLICATIONS

David Allen, Dave Bergt, David Bost, Brian Clark, Ian Falconer, Jean-Michel Hache, Craig Kienitz, Marc Lesage, John Ramsus, Calude Roulet, Peter Wraight; Logging While Drilling; Oilfield Review; vol. 1; No. 1 pp. 4-17.
(Continued)

*Primary Examiner* — Raymond L Nimox
(74) *Attorney, Agent, or Firm* — Novick, Kim & Lee, PLLC; Allen Xue

(57) ABSTRACT

A computer-implemented method that uses a preprogrammed neural network and a trained neural network computer program product to predict and then compared borehole and formation sigmas, when using a pulse neutron source and at least three dual-function radiation detectors. These dual-function radiation detectors are used for detecting both neutrons and gamma rays and further pre-programmed to distinguish between neutrons and gamma rays by using pulse shape discrimination techniques. The trained neural network computer program product can be used on above-surface systems, as well as below surface systems like borehole assemblies in logging-while-drilling systems. Once thermal neutron time-decay signals and capture gamma ray time-decay signals are measured by the at least three-dual function radiation detectors, a non-transitory computer readable memory device with the trained neural network computer program product is used to obtain a true
(Continued)

borehole sigma and true formation sigma as the measurements are not affected by near-wellbore environments.

8 Claims, 9 Drawing Sheets

(51) Int. Cl.
*G06F 17/18* (2006.01)
*G01V 5/12* (2006.01)
*G06N 3/045* (2023.01)

(56) References Cited

U.S. PATENT DOCUMENTS

| | | | |
|---|---|---|---|
| 4,760,252 | A | 7/1988 | Albats |
| 4,814,610 | A | 3/1989 | Attali |
| 7,148,471 | B2 | 12/2006 | Roscoe |
| 7,294,829 | B2 | 11/2007 | Gilchrist |
| 7,365,307 | B2 | 4/2008 | Stoller |
| 7,642,507 | B2 | 1/2010 | Radtke |
| 8,050,866 | B2 | 11/2011 | Jacobson |
| 8,558,165 | B2 | 10/2013 | Evans |
| 8,598,510 | B2 | 12/2013 | Zhang |
| 8,642,944 | B2 | 2/2014 | Saenger |
| 8,849,573 | B2 | 9/2014 | Zhang |
| RE45,226 | E | 11/2014 | Odom |
| 8,881,808 | B2 | 11/2014 | Dorffer et al. |
| 9,341,737 | B2 | 5/2016 | Inanc |
| 9,447,680 | B2 | 9/2016 | Thornton |
| 10,473,813 | B2 | 11/2019 | Zhou |
| 10,585,209 | B2 | 3/2020 | Inanc |
| 2009/0045329 | A1 | 2/2009 | Stoller |
| 2010/0193676 | A1* | 8/2010 | Jacobson ............... G01V 5/102 250/269.6 |
| 2010/0228483 | A1 | 9/2010 | Lecompte |
| 2011/0137566 | A1* | 6/2011 | Jacobson ............... G01V 5/101 702/8 |
| 2011/0282818 | A1* | 11/2011 | Chen ............... G01V 5/125 706/21 |
| 2010/2012610 | | 5/2012 | Zhou |
| 2013/0048849 | A1* | 2/2013 | Li ............... G01V 5/101 250/269.8 |
| 2013/0206972 | A1 | 8/2013 | Zhou |
| 2015/0218914 | A1 | 8/2015 | Marx et al. |
| 2017/0045639 | A1* | 2/2017 | Zhou ............... G01V 5/102 |
| 2017/0227671 | A1* | 8/2017 | Zhou ............... G01V 5/101 |
| 2017/0329041 | A1 | 11/2017 | Zhang |
| 2018/0335546 | A1* | 11/2018 | Inanc ............... G01V 5/105 |
| 2022/0171087 | A1* | 6/2022 | Mamtimin ............... G01V 5/105 |
| 2022/0179121 | A1* | 6/2022 | Craddock ............... E21B 49/005 |

OTHER PUBLICATIONS

J. Reijonen, N. Andersen, F. Gicquel, R. Gough, M. King, T. Kalvas, K.-N. Leung, T.-P. Lou, H. Vainionpaa, A. Antolak, D. Morse, B. Doyle, G. Miller, M. Piestrup; Development of Advanced Neutron/Gamma Generators for Imaging and Active Interrogation Applications; Optics and Photonics in Global Homeland Security III; Proc of SPIE vol. 6540, pp. 1-12.

Kang Yang, Peter R. Menge; Scintillation Properties and Temperature Responses of Cs2LiLaBr6:Ce3+; 978-1-4799-0534-8/13; 2013; IEEE; p. 1-6.

K. Bergaoui, N. Reguigui, C.K. Gary; C. Brown, J. T. Cremer, J.H. Vainionpaa, M.A. Piestrup; Development of a new deuterium-deuterium (D-D) neutron generator for prompt gamma ray neutron activation analysis; Applied Radiation and Isotopes; Sep. 8, 2014; pp. 1-37.

James Hood; High Speed Telemetry Drill Pipe Network Optimizes Drilling Dynamic and Wellbore Placement; 2008 IADC/SPE Drilling Conference held in Orlando, Florida, U.S.A., Mar. 4-6, 2008; pp. 1-8.

Kang Yang; Peter R. Menge; Julien Lejay; Valdimir Ouspenski; Improving the Neutron and Gamma-Ray Response of Cs2LiLaBr6:Ce3+; 2013 IEEE Nuclear Science Symposium & Medical Imaging Conference Oct. 27-Nov. 2, 2013, COEX, Seoul, Korea; p. 1.

International Atomic Energy Agency, Physics Section, Neutron generators for analytical purposes.—Vienna : International Atomic Energy Agency, 2012; pp. 1-91. ; 30 cm.—(IAEA radiation technology reports).

Jerome A Truax, James Witkowsky; Field Test Results of a New Neutron Induce Gamma Ray Spectroscopy Geochemical Logging Tool; 2009 SPE Annual Technical Conference and Exhibition held in New Orleans, Louisiana, USA, Oct. 4-7, 2009; pp. 2-23.

Leyla Muradkhanli; Neural Networks for Prediction of Oil Production; IFA Conference Paper Archive; 2018; pp. 415-417.

International Atomic Energy Agency, Signal Processing and Electronics for Nuclear Spectrometry; Proceedings of a Technical Meeting; Vienna, Nov. 20-23, 2007.

Husan Alkinani, Shari Dunn-Norman, Abo Taleb Tuama Al-Hameedi, Ralph Flori; Applications of Artificial Neural Networks in the Petroleum Industry: A Review; Society of Petroleum Engineers; pp. 2-13; Mar. 26, 2019.

* cited by examiner

COMPUTER-IMPLEMENTED METHOD OF USING A NON-TRANSITORY COMPUTER READABLE MEMORY DEVICE WITH A PRE PROGRAMMED NEURAL NETWORK AND A TRAINED NEURAL NETWORK COMPUTER PROGRAM PRODUCT FOR OBTAINING A TRUE BOREHOLE SIGMA AND A TRUE FORMATION SIGMA

TECHNICAL FIELD

The present disclosure relates generally to wireline or logging-while-drilling systems and methods that use trained neural networks to predict and then compared borehole constants, formation constants as well borehole sigmas and formation constants sigmas, when using a pulsed neutron source and multiple dual-function radiation detectors of neutrons and gamma rays that are pre-programmed to distinguish between neutrons and gamma rays by using pulse shape discrimination techniques.

BACKGROUND OF INVENTION

1. Overview

Neutron logging began in the early 1940s as an innovative method for measuring subsurface formations of interest and geological structures. It was first introduced using a chemical neutron source, particularly RaBe, in combination with a single radiation detector used primarily for counting gamma rays emitted when hydrogen and chlorine captured certain thermal neutron. An example of said tools was first introduced in the 1960s by Dresser Atlas, a predecessor of Baker Atlas. This tool had proven to be very successful at determining water saturation in saltwater-bearing reservoirs. Nonetheless, it was soon discovered that because hydrogen had by far the greatest effect on neutron transport, the borehole effects on such tool are large. Therefore, a compensating tool had to be incorporated wherein an isotopic source (most often americium-beryllium) with, in this case, two neutron-radiation detectors were used to measure the size of the neutron cloud by characterizing the falloff of neutrons between said two detectors. The use of neutrons proved to be a better solution as they penetrate further than gamma rays, therefore minimizing the complexity of said tools. Furthermore, said tool required little collimation and did not be pressed against the borehole wall.

Later, to measure the macroscopic thermal neutron capture cross-section (Sigma) of the formations surrounding a borehole, further computation was needed and therefore the introduction of measuring the decline of the thermal neutron population in said formations within a fixed period was required. As such, Dresser Atlas, introduced the measuring of the emission of a burst of high energy neutrons which were then divided by the radiations of such thermal neutrons into two equal groups, and then used to computed compute the rate of change over the selected time interval. The basic theory behind all of this comprised of neutrons being emitted from a source, wherein said neutrons interacted with the surrounding rock formations in several ways depending on the local geology. Particularly, water and hydrocarbons will slow down (thermalize) the neutrons, then neutrons will scatter inelastically from some elements resulting in the emission of gamma rays, and finally certain elements will capture the neutrons either right away or after they slow down, emitting gamma rays and reducing neutron flux.

Thereafter, several other techniques were also developed to obtain more accurate measurement results, which incorporated the correction of thermal neutron diffusion effects and near-wellbore environmental effects, such as wellbore size, casing size, wellbore fluid, cement thickness etc., so that pulse neutron tools can be operated in a variety of field applications. However, those environmental corrections were (and still are) often quite complicate but not extensively complete and perfect in all field situations.

In particular, the two most common methods where pulse generator tools have been used are for wireline measurement, and logging-while-drilling (LWD). For wireline measurements, the entire drill string is removed, and the measurement tool string inserted into the well, causing the measurements to be done from the bottom up. In contrast, during LWD the measuring tools are included in the drill string, and data collected is telemetered to the surface.

Fast forward a few decades and a typical modern sigma logging tool nowadays would consist of a deuterium-trillium (D-T) pulsed neutron generator and two, single source detectors (i.e., either thermal neutrons or gamma rays but not both). The D-T neutron generator seems to have been chosen as the default source, because the cross section of D-T fusion reaction is two orders of magnitude higher than that of a deuterium-deuterium (D-D) reaction. As a result, the neutron yield of a D-T generator is two orders of magnitude higher than that of a D-D neutron generator when the current of D ions is same. As a result, detector count rates are much higher, which resulted in a much smaller statistical uncertainty when a D-T neutron generator is utilized in the tool. The detectors, due to their computational shortcoming were only programmed to detect either the time-decay of thermal neutrons by using two neutron detectors, or the time-decay of capture gamma rays. In fact, the latter required the use of two specialized gamma ray detectors. For an example, gaseous detectors like He-3 tubes are utilized to detect neutrons and a variety of scintillation detectors (e.g., NaI, CsI, GSO, BGO, LaBr3 scintillators and photomultiplier tubes) are utilized to detect gamma rays. Again, these detectors can only detect either neutrons or gamma rays, but not both.

Nonetheless, among the advantages of using neutron generators one can still find that they: (a) output at least three times as many neutrons per second as the AmBe source they were originally replaces; (b) cause less dose to workers; (c) are easier to store as when they are off, they don't produce any external radiation; (d) are less difficult to license; (e) do not require leak testing; (f) are easier to ship; and (g) allow for more types of measurements because of timing. In general, the purpose of seismic exploration is to image the subsurface of a survey region to identify potential locations of hydrocarbon underneath the surface.

2. Measuring and Detecting

Determining characteristics of earth formations to obtain information indicative of hydrocarbon content is a highly difficult task. In a typical method, high energy neutrons penetrate the subsurface formation and while interacting with the subsurface formation the energy of this neutrons decreases. At low (thermal) energies, neutrons are captured in the nuclei of the constituents, and upon such capture, the energized nuclei release a gamma ray which is detected in logging tool. Since gamma rays are highly energetic and have a relatively long mean-free path, the amplitude and decay time characteristics of the detected gamma rays represent the volume averaged characteristics of the constituents of both the borehole and the surrounding formation. Nonetheless, two primary formation characteristics are interest to those skilled in the art: (a) the macroscopic thermal capture cross-section of the formation (formation sigma, or Sigma, in cu units), and (b) the formation porosity (in p.u. units). Out of the two, macroscopic thermal neutron capture cross section (sigma) logs are the most important in formation evaluation. As such, borehole sigma logs are utilized to examine near wellbore information, such as borehole salinity and its variations inside a wellbore, the changes of casing string, etc. In contrast, formation sigma logs are utilized to evaluate water/oil/gas saturation, water/oil/gas contact locations, and remaining oil and gas reserve of a downhole reservoir.

One proposed method is performed by measuring and fitting the time-decay curve of either thermal neutrons or neutron-capture gamma rays after a neutron pulse (or a number of neutron pulses) using two exponential time-decay functions, a time-decay constant in an early time window which is more sensitive to the material in the borehole region, and the other time-decay constant in a late time window which is more sensitive to the material in formation region, can be obtained. The two time-decay constants can be utilized to obtain the borehole sigma and the formation sigma. And using two detectors helps to correct thermal neutron diffusion effect and obtain other measurements, such as formation porosity.

Another method for determining formation sigma from the processing of the count rate decay curve of the gamma rays sensed in the detector has been proposed, where in essence, the decay curve immediately following the pulsing of the source is used to eliminate the effect of counts due to interactions in the borehole, so that counts due to thermal capture in the formation strongly predominate. The decay time constant of the gamma counts due to thermal neutron capture is then utilized to compute the formation sigma using any one of a variety of known techniques for modeling the interaction of neutrons with matter, e.g., by solving the neutron diffusion equation using terms in which formation sigma is a parameter.

In recent years, the development of $Cs_2LiYCl_6$(CLYC) and $Cs_2LiLaBr_6$(CLLB) crystals make it possible to detect both neutrons and gamma rays using one scintillation detector. This would enable a person having ordinary skills in the art to develop a nuclear tool capable of taking more multiple measurements at the same time. Furthermore, since near-wellbore materials have very different effects on the thermal neutron time-decay and capture gamma ray decay, as different materials (wellbore fluids, casing, cement etc.) have different attenuations for thermal neutrons and gamma rays, it would be also possible to automatically compensate all the environmental effects if both thermal neutrons time-decay and capture gamma ray time-decay were measured by using multiple dual-function detectors at different distances from a source.

Recently, two scintillators: $Cs_2LiYCl_6$(CLYC) and $Cs_2LiLaBr_6$(CLLB) crystals, were developed, which are sensitive to both neutrons and gamma rays. See J. Glodo, R. Hawrami, K. S. Shah, "*Development of $Cs_2LiYCl_6$ scintillator*", Journal of Crystal Growth, Volume 379, 15 Sep. 2013, Pages 73-78, and Kan Yang, Peter R. Meng, Julien Lejay, Vladimir Ouspenski, "*Improving the Neutron and Gamma-ray Response of $Cs_2LiLaBr_6$:$Ce^{3+}$*", 2013 IEEE Nuclear Science Symposium & Medical Imaging Conference, Oct. 27-Nov. 2, 2013, COEX, Seoul, Korea. Basically, these new scintillators were coupled to scintillation-light-sensitive components, such as a photomultiplier tube (PMT), and were proven to effectively detect both neutrons and gamma rays.

Also in recent years, major improvements have been reached pertaining the technology used in neutron pulse generator. Originally, most neutron pulse generators comprise primarily of deuterium-tritium (D-T), which is known to require special controls. Nonetheless, persons skilled in the art are beginning to consider the use of deuterium-deuterium (D-D) for their logging application but the computational methods are lagging. This is mainly given by the fact that the statistical uncertainty of a sigma measurement due to low neutron yield from a D-D generator is substantially reduced. As a result, the application of D-D has been limited to mostly experimental in nature. Nonetheless, since the neutron energy from a D-D neutron generator is much lower than that from a D-T neutron generator (2.45 MeV vs 14.1 MeV), gamma rays from fast neutron inelastic scattering is significantly reduced, as 2.45 MeV neutrons would not initiate as much as fast neutron inelastic scattering on elements as 14.1 MeV neutrons. Consequently, the effect of background gamma rays from fast neutron inelastic scattering on the capture gamma ray time-decay measurement is substantially reduced. Therefore, the background from neutron inelastic gamma rays particularly affects the time-decay measurement in the early time window.

Due to the foregoing and considering the current methods and systems in obtaining borehole sigma and formation sigma measurements and new advances in detector technology, a more advanced nuclear logging computational method, which has potential to take multiple measurements accurately and compensate for all environmental effects automatically is needed.

3. Principles of Formation Sigma Measurement

The formation sigma is typically measured by irradiating a formation with short fast neutron pulses from a D-T neutron generator. Fast neutrons are quickly slowed down to thermal energies after a pulse by successive inelastic scattering and elastic scattering with nuclei of elements in the surrounding media. Then the thermalized neutrons are captured by the formation elements and gamma rays are emitted. The rate at which thermal neurons are captured, and therefore the emitting rate of capture gamma rays after the pulse, depends on the macroscopic cross section of the formation to thermal neutrons, which can be expressed by an exponential decay with the time in an infinite media.

When the frequency of neutron pulses from a neutron generator is low (e.g., 1 kHz) and the neutron duty time is short (e.g., 30 μs), the long time (e.g., from 30 μs to 1000 μs) between the neutron pulses would allow one skilled in the art to obtain the thermal neutron time-decay curve, either by detecting the thermal neutron time-decay directly or the capture gamma ray time-decay indirectly by detectors.

In a typical well logging situation, the materials in the wellbore region, such as borehole fluid in an open hole or casing and cement in a cased hole, are usually significantly different from the formation. Hence, the total time-decay is not a singular exponential decay. If thermal neutron diffusion effect is ignored, the thermal neutron fluence rate and therefore the detector count rate in the vicinity of a well borehole following a burst of high energy neutrons, may be described as the sum of two exponential decays (one is a borehole component, where borehole decay dominates the decay in an early time window, the other is a formation component, where formation decay dominates the decay in a later time window) and a background component. This may be expressed mathematically as in Equation 1:

$$C(t) = A_b e^{-\Sigma_b v \cdot t} + A_f e^{-\Sigma_f v \cdot t} + B \quad (1)$$

Where C(t) is the count rate in the unit of count per second (cps) measured at a detector at time t in the unit of microsecond (μs), the reference time may be the start of a neutron pulse. $A_b$ and $A_f$ are constants which may be interpreted as initial amplitudes of the borehole component and the formation component, in the unit of cps. $\Sigma_b$ and $\Sigma_f$ is acroscopic thermal neutron capture cross-section (sigma) of the borehole and the formation, respectively, in the unit of 1/cm v is the thermal neutron speed, in the unit of cm/μs. B represents the background, in the unit of cps.

It is well-known that when the neutron energy is less than 1 eV, its absorption cross-section increases proportionally to 1/v if the neutron is in equilibrium with a surrounding media. This phenomenon is due to the fact the nuclear force between the target nucleus and the neutron has a longer time to interact. The neuron energy upper limit for 1/v law depends on the element weight, the heavier an element is, the lower the threshold is. Hence, for almost all elements, when the neutron energy is less than the 1 eV, the formulation tends to be as follows:

$$\sum \cdot v = k \text{ (constant)} \quad (2)$$

Or $$\sum \cdot v = \frac{1}{\tau} \quad (3)$$

Where k is the decay constant in the unit of 1/μs and τ is the mean lifetime of neutrons in material, in the unit of μs. This leads to being able to rewrite Equation (1) as follows:

$$C(t) = A_b e^{-\frac{t}{\tau_b}} + A_f e^{-\frac{t}{\tau_f}} + B \quad (4)$$

Where $\tau_b$ and $\tau_f$ is the mean neutron lifetime of the materials in borehole region and in the formation region, respectively.

In the oil and gas industry, τ has been referred as both the mean neutron lifetime and the time-decay constant for a long time in previous literatures. Hence, the mean neutron lifetime and the time-decay constant are used alternatively. In fact, because Equations (2) and (3) hold true for all neutrons with energy in the 1/v range, while the upper limit of neutrons in 1/v range for almost all elements is 1 eV; the mean neutron lifetime is constant not only for thermal neutrons, but also epithermal neutrons in the measurement.

Furthermore, in the oil and gas industry, the unit of the macroscopic thermal neutron capture cross-section Σ is capture unit (c.u.), which is one thousandth of 1/cm. Therefore, the thermal neutron capture cross-section can be obtained by using Equation (5) as soon as the neutron decay time constant is measured.

$$\sum = \frac{1}{v_n \tau} = \frac{1}{0.2198\tau} = \frac{4.550}{\tau}(1/\text{cm}) = \frac{4.550 \times 10^3}{\tau}(c.u.) \quad (5)$$

Given that the thermal neutron decay constant itself only depends on the density of material, the formation sigma measurement is always accurate for a specific density of material, no matter what the temperature is. The reason is that when the temperature increases, neutron speed increases, but sigma decreases proportionally. As a result, the multiplication of sigma and neutron speed (thermal neutron decay constant) does not change. Furthermore, in accordance with Equation (4) that uses a fixed thermal neutron speed to obtain the formation sigma, the sigma should not change. The only thing a person having ordinary skills in the art may pay attention to, when evaluating formation sigma is the change of density of material, such as the density of formation matrix, the density of pore, due to temperature variations.

4. Principles of Sigma Measurements

Early pulsed neutron tools measured the thermal neutron mean lifetime by using one scintillation counter. Formation sigma was then obtained by using Equation (5). Nonetheless, modern pulsed neutron logging tools incorporate two detectors in sigma measurement. The use of two detectors not only allowed for the development of correction algorithms for neutron diffusion effects and borehole environmental effects on the formation sigma measurement, but also permitted other measurements, such as to obtain a ratio-based formation porosity.

There are two main types pulsed neutron tools for sigma measurement, in which different types of radiation detectors are utilized to detect either neutrons or gamma rays. One is pulsed neutron-neutron (PNN) tools, in which He-3 proportional counters, are utilized to detect the time decay of thermal neutrons directly. The other is pulsed neutron capture (PNC) tools, in which a variety of scintillation detectors, are adopted to detect the time decay of capture gamma rays to obtain the thermal neutron time decay indirectly. Both PNN and PNC tools have their distinctive features, which makes them attractive tools for specific applications.

Particularly, the PNN tools are less affected by background radiations (such as the background from short-lived gamma radiations due to neutron activation) than the PNC tools. That is why the neuron measurement do not need to burst-off background cycle of the source. Since thermal neutrons are much easier to be shielded than capture gamma rays, the formation component has been enhanced by the shielding and/or window design in the tool, so that the tool is only sensitive to thermal neutrons from a particular angle. With such configurations, the detector response to borehole neutrons was minimized, which is especially helpful in wireline logging, where the borehole is usually much larger than the tool diameter. Moreover, the temperature rating of PNN tools is slightly higher due to the use of gaseous He-3 detectors, which have slightly higher temperature rating than traditional scintillation detectors. Furthermore, PNN tools are more sensitive to porosity change when the source-to-detector distances are same as PNC tools. As a result, a shorter source-to-detector distance can be achieved to obtain the same tool sensitivity to the formation porosity, which results in a better vertical resolution of the measurement. Together with its shallower depth of investigation, makes them more attractive to thin bed formation determination.

On the other hand, the PNC tools, have much higher detector counting rate and therefore better statistical uncertainty. Moreover, the penetration ranges of capture gamma rays are longer than that of thermal neutrons, as a result, the depth of investigation of PNC tools is deeper and the measurement is more on the formation than near-wellbore environments. Various techniques have also been developed in the past, such as the progresses on high-temperature scintillation crystals and high-temperature PMTs, the background subtraction techniques, etc., making them very popular in field applications.

5. The Tools: Neutron Generators, Detectors, Electronic Systems, and Non-Transitory Computer Readable Memory Devices for Data Processing As previously discussed, Neutron generators are neutron source devices which contain compact linear particle accelerators and that produce neutrons by fusing isotopes of hydrogen together. The fusion reactions take place in these devices by accelerating either deuterium, tritium, or a mixture of these two isotopes towards a metal hydride target which also contains deuterium, tritium, or a mixture of these isotopes. Fusion of deuterium nuclei (D+D) results in a He-3 nucleus and a neutron with a kinetic energy of approximately 2.5 MeV. Fusion of a deuterium and a tritium nuclei (D+T) result in a He-4 nucleus and a neutron with a kinetic energy of approximately 14.1 MeV. See Reijonen, J. "*Compact Neutron Generators for Medical, Homeland Security, and Planetary Exploration*". Proceedings of 2005 Particle Accelerator Conference, Knoxville, Tenn.: 49-53.

For formation sigma measurement in oil and gas industry, the D-T type neutron generators are commonly utilized in pulsed neutron tools as the neutron outputs are about two orders of magnitudes higher than the D-D type neutron generators. However, the D-D type neutron generators would be more preferred if the outputs of neutrons could be as high as current D-T generators, as the neutron energy from the D-D reaction is much lower than the D-T reaction. As a result, it initiates less gamma rays from inelastic scattering and less background from short-lived gamma ray radiations from fast neutron activations, which affects data processing of capture gamma ray decay from detectors for the PNC tools, especially in the early time of the decay.

Over the years, substantial progresses have been made to continue refine the design and manufacture of pulsed neutron generators, which have improved the neutron yield, reliability, and lifetime of generators greatly. See D. Rose, T. Zhou et al, "*An Innovative Slim Pulsed Neutron Logging Tool*", SPWLA 56th Annual Logging Symposium, Long Beach, Calif., USA, Jul. 18, 2015, and International Atomic Energy Agency, "*Signal Processing and Electronics for Nuclear Spectrometry*", Proceedings of a technical meeting, Vienna, 20-23 Nov. 2007. Furthermore, the neutron duty time and the frequency of the neutron pulse schematics can be adjusted and optimized for the formation sigma measurement by simulations and experiments.

As it pertains to the radiation detectors used in these tools, a person having ordinary skill in the art would soon realize that there exist two main types of detectors utilized in the detection of neutrons or gamma rays in the pulsed neutron tools for formation sigma measurement. One is gaseous detectors, like He-3 tubes to detect neutrons and the other is a variety of scintillation detectors (e.g., NaI, CsI, GSO, BGO, $LaBr_3$ scintillators and photomultiplier tubes) to detect gamma rays. As it can observed, the detectors are used to detect either neutrons or gamma rays, but not both. As previously mentioned, this is not due to a lack of capability in the detectors side, but more so to a lack of development in computer algorithms to first discriminate and then process the two signals.

For scintillation detectors, the scintillators change the deposited energy of gamma rays into scintillation lights. The PMTs change the scintillation lights into electrons and magnify amplify them to form electronic signals.

Traditional gamma ray detectors are not sensitive to neutrons and traditional neutron detectors are not sensitive to gamma rays. The recent development of new scintillators, such as $Cs_2LiYCl_6$(CLYC) and $Cs_2LiLaBr_6$(CLLB) crystals, which are sensitive to both neutrons and gamma rays, makes it possible to design a pulsed neutron tool, which is capable to detect both neutrons and gamma rays at the same time and therefore feasible to provide more multiple measurements than a single PNN tool or a single PNC tool.

As far as electronic systems go, a person having ordinary skills in the art will soon realize that all nuclear logging tools contain electronic circuits and devices, commonly referred to as front-end electronics, which accept and process the electrical signals produced by radiation detectors. These front-end electronics are composed of a chain of signal processing subsystems that filter, amplify, shape, and digitize these electrical signals to finally produce digitally encoded information, such as type, time, and energy the radiation that stimulated the radiation detector. The objective of front-end electronics is to obtain maximum information about the radiation and with the highest possible accuracy. Historically, the front-end electronics has consisted of all analog components. Nonetheless, with the development of digital electronics, programmable logic, and digital signal processing techniques, the performance delivered has increased continually over time through the development and implementation of new and improved analog electronics and electronic designs, thereby opening new opportunities, and delivering new benefits not previously achievable.

Similar situation is observed with the implementation of non-transitory computer readable memory devices in either wireline logging or logging-while-drilling (LWD) operations.

In wireline logging, the measured data itself is recorded either at surface, or in the hole as an electronic data format and then either a printed record or electronic presentation called a "well log" is provided to a person having ordinary skills in the art, along with an electronic copy of the raw data. The data is recorded directly against measured depth. Memory data is recorded against time, and then depth data is simultaneously measured against time. The two data sets are then merged using the common time base to create an instrument response versus depth log. The measured cable depth can be derived from several different measurements but is usually either recorded based on a calibrated wheel counter, or (more accurately) using magnetic marks which provide calibrated increments of cable length. The measurements made must then be corrected for elastic stretch and temperature.

In LWD, measured data is transmitted to the surface in real-time via pressure pulses in the well's mud fluid column. This mud telemetry method provides a bandwidth of less than 10 bits per second, although, as drilling through rock is a slow process, data compression techniques are necessary so that this is an ample bandwidth for real-time delivery of information. A higher sample rate of data is recorded into memory and retrieved when the drill string is withdrawn at bit changes. High-definition downhole and subsurface information is available through networked or wired drill pipe that deliver memory quality data in real time.

6. The Introduction of Neural Network Computation Models to Oil and Gas Exploration Neural Networks (NN) are generally considered nonlinear statistical modeling tools where the complex relationship between inputs and outputs are modeled and patterns are found (See Haykin, S. m *Neural Networks: A Comprehensive Foundation,* 2nd edition, Prentice Hall, 1999, 842 pages). In fact, persons skilled in the art, generally characterized NN as computational models that simulate the structure and functional aspects of biological neural networks. As such, neural networks have an organization like that of a human brain and it is a network made up of processing elements called nodes. Nodes get data from the surrounding nodes that can be either located in the same layer or different layers to process certain computational algorithms, and then pass the results to other nodes in the same or different layers. Connections between the nodes have weight associated with them. Each connection can transmit a signal from one node to another. A node that receives a signal can process it and then signal additional nodes connected to it. Information that flows through the network affects the structure of the NN because a neural network change—or learns, in a sense—based on that input and output. Nonetheless, almost all NNs are developed based on mathematical models having the following assumptions (See Mohaghegh, S., *Virtual-Intelligence Applications in Petroleum Engineering: Part 1—Artificial,* Sep. 1, 2001, Society of Petroleum Engineers):

1. The information is processed through elements called neurons or nodes;
2. There are connections links between the nodes that let the information to pass through;
3. Each connection links have their own weights; and
4. Once the inputs received by the nodes, the nodes will apply an action function to determine an output.

In the oil and gas industry, NNs are formed in a supervised fashion, whereby the nodes and layers are trained to perform certain algorithms before they are sent to the field. In it, the first step of training a NN for petroleum exploration generally comprises gathering and selecting data to be inputted into a first input layer. Depending upon the application, the input data is chosen from experimental tests, modeling, simulations, sensitivity analysis, or an opinion from a person having ordinary skills in the art. Once the data has been inputted into the first, input layer, they are then divided into three sections: training, testing, and verification. The training section is used to achieve a desired output which is achieved generally by adjusting or calibrating the weights applied to each node. During a first training phase, the errors in the input data will self-propagate within the network until calibration is reached which is when a NN is considered trained. Calibration is reached when the network does not observe any improvements in the generalization of the data. In some cases, data normalization is required to scale the data normalization is required to prevent overstraining the network and having it run indefinitely without achieving calibration. Multiple methods of normalizing the data exist in the art.

Another aspect of a trained NN is determining the number of hidden layers and the number of nodes within each hidden layer. To do so, multiple iterations are performed starting with one (1) hidden layer and one (1) one node, until the network is found to have reached the lowest error possible typically by using an array of error formula calculations like the Total Average Absolute Deviation (TAAD) or the Mean Square Error (MSE). Once all the values are satisfied and the NN is fully trained, it is then sent to the field to perform its complex calculations. In the oil and gas industry, there exists a significant availability of historical data, which is typically used for predicting of future outcomes to help to make better decisions. Nonetheless, future predictions are always challenging due to the large uncertainties in the future that is the reason why real-time predictions using a computer-implemented method for finding true borehole and formation sigmas like the one hereby disclosed which provides good accuracy for decision makers to prepare and solve problems ahead of time. In fact, according to Table 2 from Alkinani, Husam & Al-Hameedi, Abo Taleb & Dunn-Norman, Shari & Flori, Ralph & Alsaba, Mortadha & Amer, Ahmed, (2019), *Applications of Artificial Neural Networks in the Petroleum Industry: A Review,* 2019; there exist no present application of NNs in wireline or logging while drilling engineering for finding near-well true borehole and true formation sigmas.

7. Conclusion

Given the above complexities, a person with ordinary skills in the art would soon realize that it is common to see different companies developing their logging tools and data processing algorithms independently from each other, to better suit their project or clients' constraints. Nonetheless, as discussed earlier, in true borehole and formation sigma measurements, the most well-accepted methodology is to fit either the thermal neutron decay curve or the capture gamma ray decay curve by using two exponential decays for each of two detectors, using only two single-function (i.e., either measuring thermal neutrons or gamma rays) radiation detectors. It is just that the apparent borehole sigma from the near detector provides a better borehole sigma estimation, and the apparent formation sigma from the far detector provides a better formation sigma estimation. This creates the need for further computational processing to correct a borehole and formation sigma as they need to be expressed as functions of the apparent borehole sigma and the apparent formation sigma from said two detectors, given their lack of independence from each other. This separation of the two time-decay components is the main difficult observed in today's technologies and methods used to find borehole and formation sigmas. Even if certain methods are being used, they still do not account for the effects from near wellbore environments (such as wellbore size, tool standoff, wellbore fluid salinity/density, casing, cement etc.) which are varied significantly and get added to the thermal neutron diffusion effect which makes the separation process more difficult. As a result, those effects (on neutrons and gamma rays), cannot be fully compensated at the same time. A method like the one herewith disclosed, on the other hand, can compensate all those effects and obtain two outputs (true borehole sigma, and true formation sigma) at the same time and without the need of any additional other sensors, such as temperature, pressure, acoustic tool standoff, etc.

SUMMARY OF THE INVENTION

In view of the foregoing, various embodiments of the present invention advantageously provide computer-implemented methods which use a non-transitory computer readable memory device with a pre-programmed neural network and a trained neural network computer program product for obtaining a true borehole sigma and a true formation sigma.

The disclosed multilayer feed forward neural network has one or more hidden layers, which enable the network to model nonlinear and complex functions. The hidden layer is responsible of conveying meaningful information between the input and network stages through an effective approach. In fact, the NN's interface predicts through the nodes or neurons of its input layer three acquired (acquired by the at least three dual-function detectors) neutron-induced apparent borehole time-decay constants, three acquired neutron-induced apparent formation time-decay constants, three acquired gamma-induced apparent borehole time-decay constants, and acquired gamma-induced apparent formation time-decay constants; that then get transmitted or processed through the one or multiple hidden layers, to output the true borehole sigma and the true formation sigma of its output layer. Each node in hidden and output layers carries an algorithm that illustrates the internal activation phenomenon. A node output is normally achieved through transformation of its input employing an opposite transfer function. In the embodiments herewith disclosed, the transfer functions are non-linear regression algorithms but as the data progress towards the output layer, they become linear regressions. It should be mentioned that each interconnection or node in the NN has a strength that is expressed by a number referred to as weight. Furthermore, bias is an extra input appended to nodes, and which all the time holds a value of less than one percent and treated like other weights.

Embodiments of the present invention show that the computer-implemented using a blank pre-programmed neural network and a trained of the neural network. Both networks in according to certain aspects of the present invention, there may be provided within a computer program product comprising computer-readable operating instructions which, when running on or loaded into a non-transitory computer readable memory device or when being executed by one or more processors of said non-transitory computer readable memory device, causes it to execute a method of using a non-transitory computer readable memory device with a pre-programmed neural network and a trained neural network computer program product both with three layers each, to perform the operations of obtaining a true borehole sigma and a true formation sigma. In certain aspects of the embodiments disclosed herewith, both neural networks require a set of input values to the input layer which can be either experimental values or theoretical values from an experimental data-calibrated tool model. This way, the NN uses known inputs to process and obtain outputs which are generally weighted combinations of each out the outputs of the nodes of the input layer but are compared against known values of true borehole and formation sigmas in order to complete the training phase.

Following said training phase, the weights are then kept fixed, and a plurality of samples called test sets are processed using the neural network against said fixed weights. If convergence is observed between a predicted and an actual borehole sigma and formation sigma values in the test sets, then the neural network is considered to have been well-trained, and the neural network is installed in the processor of the bottom hole assembly or data processing system on the surface for use during logging or drilling operations. If convergence is not noted in the test sets between the neural network outputs and the actual true borehole sigma and the true formation sigma, then further training is carried out. As such, this method not only provides for fast solving of complex field problems, but also requires less computational power (and time) to acquire the output when compared against other methods currently in used.

Particularly, one embodiment of the present invention consists of a borehole assembly tool embedded with a pulsed neutron source coupled with at least three dual-function radiation detectors, high-voltage suppliers and an electronic instrument having non-transitory computer readable memory device for performing the operations of processing, generating, and computing. The at least three dual-function radiation detectors may be placed at one end, or both ends of the neutron source at optimized distances to the source. The detectors are capable of detecting both neutrons and neutron-induced gamma rays simultaneously. Signals of neutrons and gamma rays from the detectors can be distinguished using a pulse shape discrimination technique, and the measured thermal neutron time-decay signals and capture gamma ray time-decay signals at multiple detectors are utilized to obtain borehole sigma and formation sigma.

The use of multiple dual-function detectors in the present disclosure has potential not only to reduce the type and number of total detectors inside of a tool, but also to take more multiple measurements at the same time and to automatically correct near-wellbore environmental effects, and therefore to provide more accurate measurement results.

In certain embodiments of the present disclosure, the pulsed neutron source, and the three dual-function radiation detectors can be disposed at the same radial or different directions, i.e., having the same or different tool face angles when deployed in the formation. Nonetheless, other embodiments of the present disclosure may have more than three detectors. For example, a system that has six detectors can be disposed opposite to each other on the cross-sectional area of the logging tool, i.e., the tool face angle. Having different tool face angles allows detectors to be placed in multiple ways, to preferentially receive neutrons and gamma-rays at certain incident angles from the formation. It also increases the detection efficiency of neutrons and gamma rays by increasing the total count rate of all the detectors. Similarly, the nuclear logging tool may have more than one neutron sources, which can be turned ON or OFF simultaneously to increase the count rates of the at least three dual-function radiation detectors, thereby reducing the statistical measurement of uncertainty.

For a pulsed neutron tool with at least three dual functional detectors, the thermal neutron count rate time-decay curve obtained at each detector, is processed by the step of computing a curve-fitting using two exponential decays, to obtain two neutron-induced apparent time-decay constants (i.e., a neutron-induced apparent borehole time decay constant $\tau_{bnn}$, and a neutron-induced apparent formation time-decay constant, $\tau_{fnn}$ from the near detector), related to an early time-decay component and a later time-decay component. Similarly, the capture gamma ray count rate time-decay curve obtained at each dual function detector is computed by curve-fitting using two exponential decays to obtain two gamma-induced apparent time-decay constants (i.e., a gamma-induced apparent borehole time-decay constant $\tau_{bgn}$, and a gamma-induced apparent formation time-decay constant, $\tau_{fgn}$ from the near detector), related to an early time-decay component and a later time-decay component. The time-decay curves from all dual-function detectors are then curve-fitted using the two exponential decays of the time-decay curve of neutron-induced capture gamma rays from a time immediately after pulsing the deuterium-tritium (D-T) neutron generator or the deuterium-deuterium (D-D) neutron generator neutron source, using the non-transitory computer readable memory device having the trained neural network computer program product. After which, the already trained neural network receives as inputs the neutron-induced apparent borehole time-decay constant, the neutron-induced apparent formation time-decay constant, the gamma-induced apparent borehole time-decay constant, and the gamma-induced apparent formation time-decay constant for each of the at least three dual-function radiation detectors; all of which are then used to processed within the deep neural network's hidden layers, weighted nonlinear and linear regression algorithm. Once the last linear regression linear algorithm within the third of the three hidden layers is processed, the neural network generates a true borehole sigma and a true formation sigma using a weighted linear regression algorithm.

Both, the pre-programmed (i.e., blank neural network) and the trained neural networks use a non-transitory computer readable memory device that contains a computer program product operable on said device, to perform the operations or instructions of acquiring, training, separating, measuring, initializing, inputting, computing, measuring, processing, sending, and generating. Said non-transitory computer readable memory device is coupled through a communication bus to a memory resource and a telemetry device for transmitting information. Upon finalizing its computational processes, embodiments of the present invention generate interim results that are used by the computer program embodied in the non-transitory memory to generate results which typically comprises true borehole sigma ($\Sigma_b$) and true formation sigma ($\Sigma_f$). Such results may be stored locally within the systems or in databases located within application servers. Further, test results showed that the present invention using systems and methods which use pulsed neutron sources and multiple dual-function radiation detectors of neutrons and gamma rays that can distinguish between neutron and gamma rays using pulse shape discrimination techniques in order to measure thermal neutron time-decay signals and thermal neutron capture gamma ray time-decay signals to obtain borehole sigma and formation sigma; has great potential for other practical applications, as well.

Nevertheless, further details, examples, and aspects of the invention will still be described below in more detail, also referring to the drawings listed in the present invention.

BRIEF DESCRIPTION OF THE DRAWINGS

The teachings of the present invention can be readily understood by considering the following detailed description in conjunction with the accompanying drawings. As such, the way the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION OF THE INVENTION

1. Introduction

Figure 1:
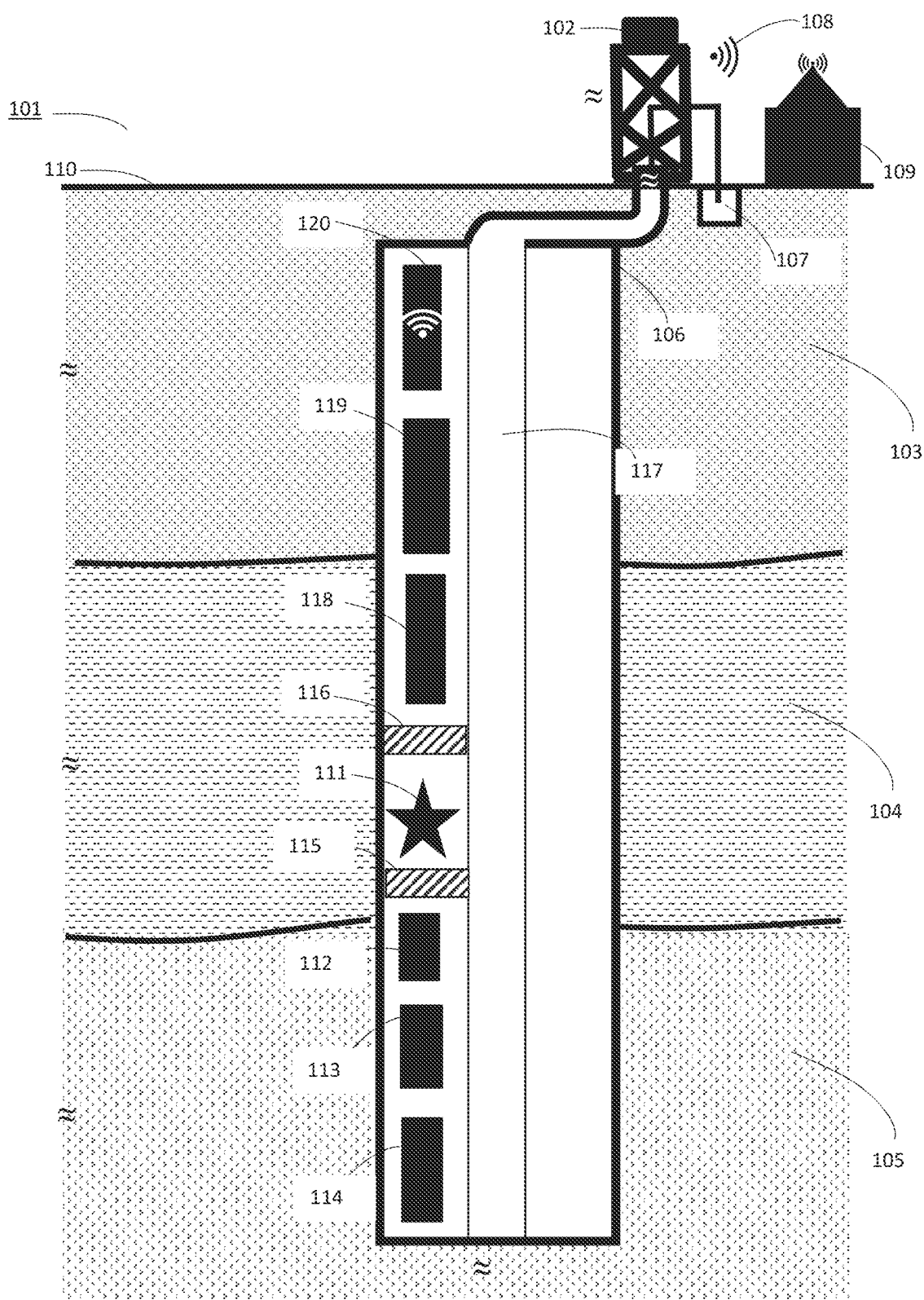
FIG. 1, illustrates a schematic diagram showing a cross-sectional view of a borehole assembly logging-while-drilling system with a pulsed neutron tool and three dual-function radiation detectors, namely a near detector, a middle detector, and a far detector, over a survey region, according to an embodiment of the present disclosure.

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a system result in the execution of the method.

Additionally, the flowcharts and block diagrams in the Figures ("FIG.") illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

2. Terminology

As used in this description and the accompanying claims, the following terms shall have the meanings indicated, unless the context otherwise requires:

A "memory resource" is a device or system that is used to store data. A memory resource may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

Any reference in the specification to a computer program product should be applied mutatis mutandis to a system capable of executing the instructions stored in the computer program product and should be applied mutatis mutandis to method that may be executed by a system that reads the instructions stored in the non-transitory computer readable medium.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

It will be understood that each block of the illustrated flowchart, and combinations of blocks, can be implemented by computer program instructions. The computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

The computer program product may also be stored in a non-transitory computer-readable memory device that can direct a computer or other programmable data processing apparatus in the borehole assembly to function in a particular manner, such that the instructions stored in the non-transitory computer readable memory device produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

A "pre-programmed non-transitory computer-readable memory device on an above-surface processing system" or a "computer program product or computing system device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

According to the preferred embodiment of the present invention, certain hardware, and software descriptions were detailed, merely as example embodiments and are not to limit the structure of implementation of the disclosed embodiments. For example, although many internal, and external components have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

It is to be noted that, as used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

Also, the term "computing" encompasses a wide variety of actions, including calculating, determining, processing, deriving, investigation, look ups (e.g., looking up in a table, a database, or another data structure), ascertaining and the like. It may also include receiving (e.g., receiving information), accessing (e.g., accessing data in a memory) and the like. "Computing" may include executing, resolving, selecting, choosing, establishing, and the like. On the other hand, the term "generating" encompasses the actions of outputting a certain constant or sigma, variable such as borehole constant, formation constant, borehole sigma, or formation sigma.

Capturing certain data may include creating or distributing the referenced data to the subject by physical, telephonic, or electronic delivery, providing access over a network to the referenced data, or creating or distributing software to the subject configured to run on the subject's workstation or computer including the reference image. In one example, acquiring of a referenced data or information could involve enabling the subject to obtain the referenced data or information in hard copy form via a printer. For example, information, software, and/or instructions could be transmitted (e.g., electronically, or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

Furthermore, modules, features, attributes, methodologies, and other aspects can be implemented as software, hardware, firmware, or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Some embodiments of the invention relate to methods of using dual-function radiation detectors to monitor the radiation output of the pulsed neutron generator. Methods of the invention may further include correcting (also referred to as neutron-induced) the monitor detector count rates for environmental effects (mainly lithology, porosity, and standoff), yielding a compensated (corrected, neutron-induced) monitor of source strength. The corrected constant, variable, or sigma can then be used to compensate other detector measurements for source strength variations that arise from, for example, imperfections in the pulse neutron generator, power fluctuations, etc. The resulting source-compensated measurements can then provide an improved accuracy in formation logging.

3. The Figures

As previously mentioned, no one system and method exist that provides effective means for a three-region (i.e.; borehole region, shallow region containing artificial constituents immediately surrounding the borehole, and the natural formation region) analysis. This is true, particularly since thermal neutrons have a shallower depth of investigation (DOI) than gamma rays. Furthermore, as the wellbore materials and artificial constituents surrounding the borehole have different attenuation effects on thermal neutrons and capture gamma rays, combining the two measurements provides a potential way to automatically compensate these near wellbore effects on the measurement, especially when multiple detectors are used, as the measurement can be affected by multiple near wellbore parameters, such as wellbore sizes, borehole salinity, casing thickness etc. As it can be observed, the main difficulty in finding a true borehole sigma and a true formation sigma measurement relies on how to separate the two time-decay components, as the two time-decays (borehole time-decay and formation time-decay) are not independent from each other. Therefore, an apparent borehole sigma and the apparent formation sigma, for example, will always have a correlation between them. Moreover, the effects from near wellbore environments (wellbore size, tool standoff, wellbore fluid salinity/density, casing, cement etc.) vary significantly which at the same time, adding a thermal neutron diffusion effect would make the separation even more difficult. To date, no method exists to date that addresses this matter. On the other hand, under embodiments of the presently disclosed computer-implemented method, it can be obtained a neutron-induced apparent borehole sigma, a gamma-induced apparent borehole sigma, a neutron-induced apparent formation sigma, a gamma-induced apparent formation sigma, a true borehole sigma and a true formation sigma, as it uses the presently disclosed computer-implemented method that uses the present trained neural network computer product can compensate all those effects and generate two outputs (true borehole sigma, and true formation sigma) at the same time due to the proposed algorithms and almost endless (only limited by time and computer resource) iterations that can be done to train the pre-programmed neural network.

Turning over to FIG. 1, it represents a typical survey region 101, over a land-based region, showing a drilling rig 102 in which, the present invention can be implemented as it penetrates through different types of earth formation, 103, 104, 105, in which an embodiment of the present invention is useful. Persons of ordinary skill in the art, will recognize that seismic survey regions produce detailed images of local geology to determine the location and size of possible hydrocarbon (oil and gas) reservoirs, and therefore a well location. Nevertheless, as observed in FIG. 1, when using wireline or logging-while-drilling (LWD) downhole systems 106 during directional drilling, to reach the well or reservoir, the wireline or LWD downhole system 106 must deviate from a vertical downward trajectory to a trajectory that is kept within prescribed limits of azimuth and inclination to reach a well or reservoir. This degree of deviation is given by a myriad of situations, but most likely due to populated or obstructed areas.

In these survey regions 101, a platform and derrick assembly 102 maybe also positioned over a wellbore for direct penetration of subsurface formations. Furthermore, downhole system 106 includes drill bit at its lower end to help penetrate the subsurface formations and reach the required reservoir. Furthermore, drilling fluid or mud stored in pit 108 is formed at the well site and sent through the mud channel 107 to lubricate the wireline or logging-while-drilling (LWD) downhole system 106 drill bit which thereafter is also used to carry formation cuttings up to the surface as it is returned to pit 107 for recirculation. Of further importance, the wireline or logging-while-drilling (LWD)

downhole system of the present disclosure includes a bottom hole assembly (BHA), 106, generally disposed near the drill bit with capabilities for measuring, processing, computing, generating, and storing information, as well as wirelessly (108) or wired communicating with an above-surface processing system 109 incase further processing is required. The measurement tools included in the BHA includes dual-function neutron and gamma ray radiation detector sensors, as well as acoustic, and resistivity logging instruments.

The above-mentioned internal components of the wireline or logging-while-drilling (LWD) downhole system 106, particularly the BHA section, are disclosed in FIG. 1 as shown below surface 110. Said BHA section of the wireline or logging-while-drilling (LWD) downhole system 106 of the present disclosure, further illustrates a pulsed neutron tool consisting of a pulsed neutron source, 111, and three dual-function radiation detectors, namely a near detector 112 (represented in algorithms by the subscript letter n), a middle detector 113 (represented in algorithms by the subscript letter n), and a far detector 114 (represented in algorithms by the subscript letter f). For the present disclosure to properly function, the pulsed neutron source 111 can be either a deuterium-tritium (D-T) neutron generator or a deuterium-deuterium (D-D) neutron generator. Which one neutron source 111 (D-T vs. D-D) to use in the tool 106 is mainly dependent on the required measurements and the neutron yield of a generator.

If measurements, such as the spectroscopy measurement is required to obtain C/O logs for oil saturation or to identify formation elements and obtain their concentrations in minerology determination, then a D-T neutron generator is the better option, as not only the energy of neutrons from the D-T reaction is much higher than the D-D reaction, which is important to initiate neutron inelastic scattering on many elements, such as C, O, Fe etc., but also the neutron yield from the D-T reaction is two orders of magnitude higher than the D-D reaction when the d ion current is same, due to the higher cross section of the D-T fusion reaction. Nonetheless, the frequency and pulse schematics would need to be balanced or properly designed for all measurements. On the other hand, if formation sigma was the only required measurement and the neutron yield of a D-D generator is as high as that of current D-T generators (in the order of magnitude of $10^8$ n/s), then a D-D generator would be preferred in the formation sigma measurement, as it doesn't irradiate as much as gamma rays from neutron inelastic scattering as a D-T generator, which contributes to the background of the decay curve in the very early time after a neutron pulse, especially for a system where scintillation detectors are utilized to detect capture gamma rays. The frequency of the D-D neutron pulses can be about 1 kHz with the neutron duty time about 50 μs. The time interval of about 950 μs between the neutron pulses is long enough for fast neutrons to be slowed down to thermal energy and decayed to the background level.

In embodiments of the present disclosure the nuclear logging tool of the BHA section 106, may have more than one neutron sources 111. Under said embodiment, one neutron source 111 maybe located at the proximal end and the other at the distal end BHA section, 106, while the radiation detectors 112, 113, and 114 can be arranged alternating between said sources. In the case of a dual neutron source, the far dual-function detector 114, is then replaced with the second neutron source being shielded in between the remaining dual-function detectors and the now two neutron sources, each of which, can then be alternately turned ON or OFF. Thereby, this induces neutrons and gamma-rays from alternately alternatively forming, which are received by the radiation detectors 112 and 113 (note that dual-function detector 114 has now been replaced by another neutron source). Since there are four different source-to-detector distances (d1 to d4), the data generated in near detector 112 and now far detector 113 may be better compensated than tools with only two or three source-to-detector distances for near wellbore effects, such as borehole size, tool standoff, mud weight and/or salinity, casing size, cement thickness, etc. As a result, the obtained formation parameters will be more accurate. Nonetheless, when the sources 111 and detectors 112, 113, and 114 have different tool face angles, the data generated in near detector 112, middle detector 113, and far detector 114, will reflect different sectors of the formation, which can then reveal differences amongst various formation sectors at any given time by comparing the measurements from the each of the at least three dual-function detectors.

Figure 4:
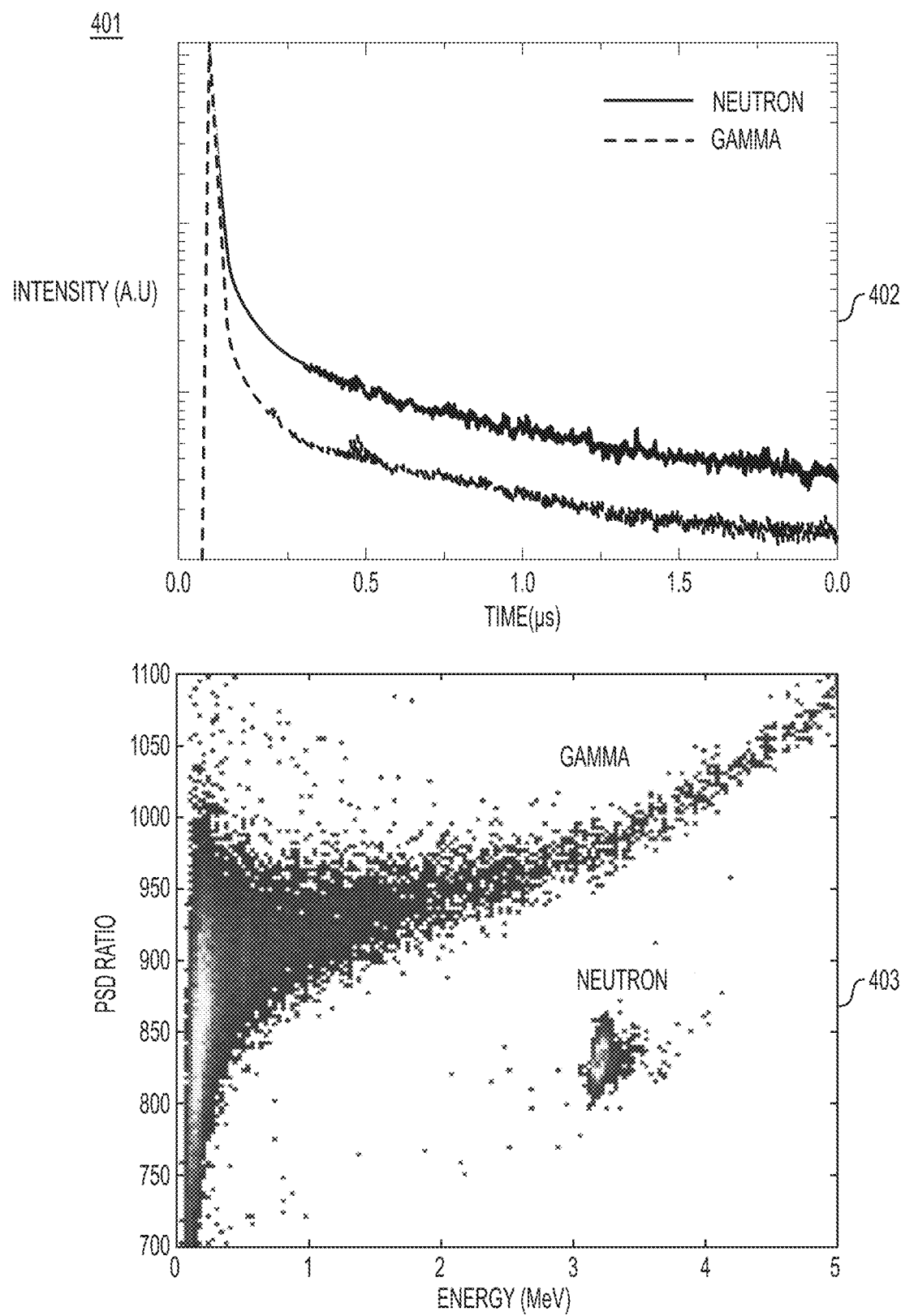
FIG. 4, illustrates the pulse height discrimination technique showing the separation between neutron and gamma rays, according to an embodiment of the present disclosure.

As it pertains to the three detectors, 112, 113, and 114 embodiments of the present invention use solely those that detect both neutrons and gamma rays. The crystal used in the detectors can be either $Cs_2LiYCl_6$(CLYC) or $Cs_2LiLaBr_6$ (CLLB), which are sensitive to both neutrons and gamma rays. However, a $Cs_2LiLaBr_6$(CLLB) crystal is preferred as it performs better at higher temperatures. Therefore, it would not be necessary to have a cooling device, such as a flask, to house these detectors as observed with existing technologies. By coupling said detectors to a scintillation light sensitive component, such as a photomultiplier tube (PMT), such scintillator can be effectively utilized to detect both neutrons and gamma rays. The three dual-function radiation detectors 112, 113, and 114 are pre-programmed through a non-transitory computer-readable memory device using pulsed shape discrimination technique as illustrated in FIG. 4. The three detectors, 112, 113, and 114 may be placed at one end of the pulsed neutron source or one detector may be placed at one end and the other two detectors may be placed at the other end of the pulsed neutron source. Nonetheless, persons having ordinary skills in the art will soon recognize that certain embodiments of the present disclosure, can also dispose the pulsed neutron source 111, the near detector 112, the middle detector 113, and the far detector 114, at the same radial or different directions, i.e., having the same or different tool face angles when deployed in the formation. In other embodiments of the present disclosure, the wireline or logging-while-drilling (LWD) downhole system 106, particularly the BHA section, may have more than three detectors. For example, it can have six detectors, wherein said detectors are disposed opposite to each other on the cross-sectional area of the logging tool (i.e., the tool face) at angles of 0 degrees and 180 degrees, while the rest being disposed at 120 degrees apart on the cross-sectional area of the wireline or logging-while-drilling (LWD) downhole system 106. The positioning of the detectors not only allows for persons having ordinary skills in the art to use different tool face angles, but it also allows detectors to preferentially receive neutrons and gamma-rays at certain incident angles from the formation. Furthermore, it also increases the detection efficiency of neutrons and gamma rays by increasing the total count rate of all the detectors.

Other embodiments of the present disclosure have within the BHA section of wireline or logging-while-drilling (LWD) downhole system 106, four radiation detectors and two neutron sources. In this embodiment, detectors are paired and disposed at substantially the same distance from the different sources. As indicated before, having more than one detector at a certain distance increase the count rate at that distance so that a less powerful neutron source may be viable. The count rate of one far detector may be too low to provide reliable measurement data, therefore by using two or more far detectors, the count rate will be significantly increased so that reliable measurement results can be obtained by processing data from the multiple far detectors.

Further, embodiments of the present disclosure illustrate a logging tool BHA section of the wireline or logging-while-drilling (LWD) downhole system 106, with multiple shields 115 and 116 that can absorb neutrons and gamma-rays. The shields need to be placed in the logging tool BHA section of the wireline or logging-while-drilling (LWD) downhole system 106 between the neutron source, 111, and the detectors 112, 113, and 114, as well as 116 between the neutron source 111 and the rest of the internal equipment 117, 118, 119 and 120 so that said detectors receive neutrons and gamma-rays coming from the formation rather than traveling through the logging tool itself. Alternatively, the detectors can also be partially shielded by the shielding material that absorbs neutrons and gamma rays from certain directions. The shields 115 and 116 are made of, or contain, one or more materials that can effectively attenuate both thermal neutrons and gamma rays. The materials of the shields 115 and 116 can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals, such as Fe, Pb, or W, or materials containing boron with other heavy elements, such as tungsten borides (WB, $WB_2$, etc.).

Regarding the rest of the internal components of the logging tool BHA section, 106, disposed inside the wireline or logging-while-drilling (LWD) downhole system, it is further illustrated a mud channel 117, a high voltage supplier 118, an electronics instrumentation 119 and a telemetry system 120. The mud channel 117 is also used to transmit neutron and gamma measurement data during LWD to the surface, while the on-board electronics instrumentation 119 is also used to process, compute, generated, and store some data of the either the wireline or the LWD tool. For the latter, said data which will typically comprise of all the captured, processed, computed, generated, and stored information achieved during the method herewith disclosed, can also be retrieved when the tool back to the surface. Regardless, the essential data is still going to be further processed by the above-surface processing system 109, and further illustrated in FIG. 6. The electronic system 119 assist with the amplification of the signals of neutrons and gamma rays from detectors 112, 113, and 114 which are also distinguished using the embedded non-transitory computer readable memory device of the electronic system 119 from each other, by using a pulsed shape discrimination (PSD) technique, as shown in FIG. 4. Digital signal processing system in the electronic system 119 is a preferred embodiment of the disclosure as it provides more accurate measurement. A telemetry subassembly is also included within the logging tool BHA section, 120, disposed inside the wireline or logging-while-drilling (LWD) downhole system 106, mainly for data and control communication with the earth's surface. Such apparatus may be of any suitable type, e.g., a mud pulse (pressure or acoustic) telemetry system, which receives output signals from the data measuring sensors and transmits encoded signals representative of such outputs to the surface where the signals are detected, decoded in an above-surface processing system 109 and applied to a processor and/or a recorder as further illustrated in FIG. 6. Calibration of the of the logging tool BHA section, 106, disposed inside the wireline or logging-while-drilling (LWD) downhole system is accomplished by the use of laboratory formations. These specially built formations allow the of the logging tool BHA section, 106, disposed inside the wireline or logging-while-drilling (LWD) downhole system response to be characterized for various borehole sigma, formation sigma, borehole size borehole fluid, casing, and cement. In any given laboratory formation, the basic measurement that is taken from the tool is the neutron-induced apparent borehole time-decay constant, the neuron-induced apparent formation time-decay constant, the gamma-induced apparent borehole time-decay constant, and gamma-induced apparent formation time-decay constant, from each of three detectors. These are then computed by dividing the near count rate by the middle count rate, the near count rate by the far count rate, the middle count rate by the far count rate, and then averaging all three values. After the neutron-induced apparent borehole time-decay constant, the neuron-induced apparent formation time-decay constant, the gamma-induced apparent borehole time-decay constant, and gamma-induced apparent formation time-decay constant, have been obtained from each of three detectors in all of the laboratory formations, it is possible to generate calibration curves and the use them as a pre-programmed neural network for later training.

Figure 2A:
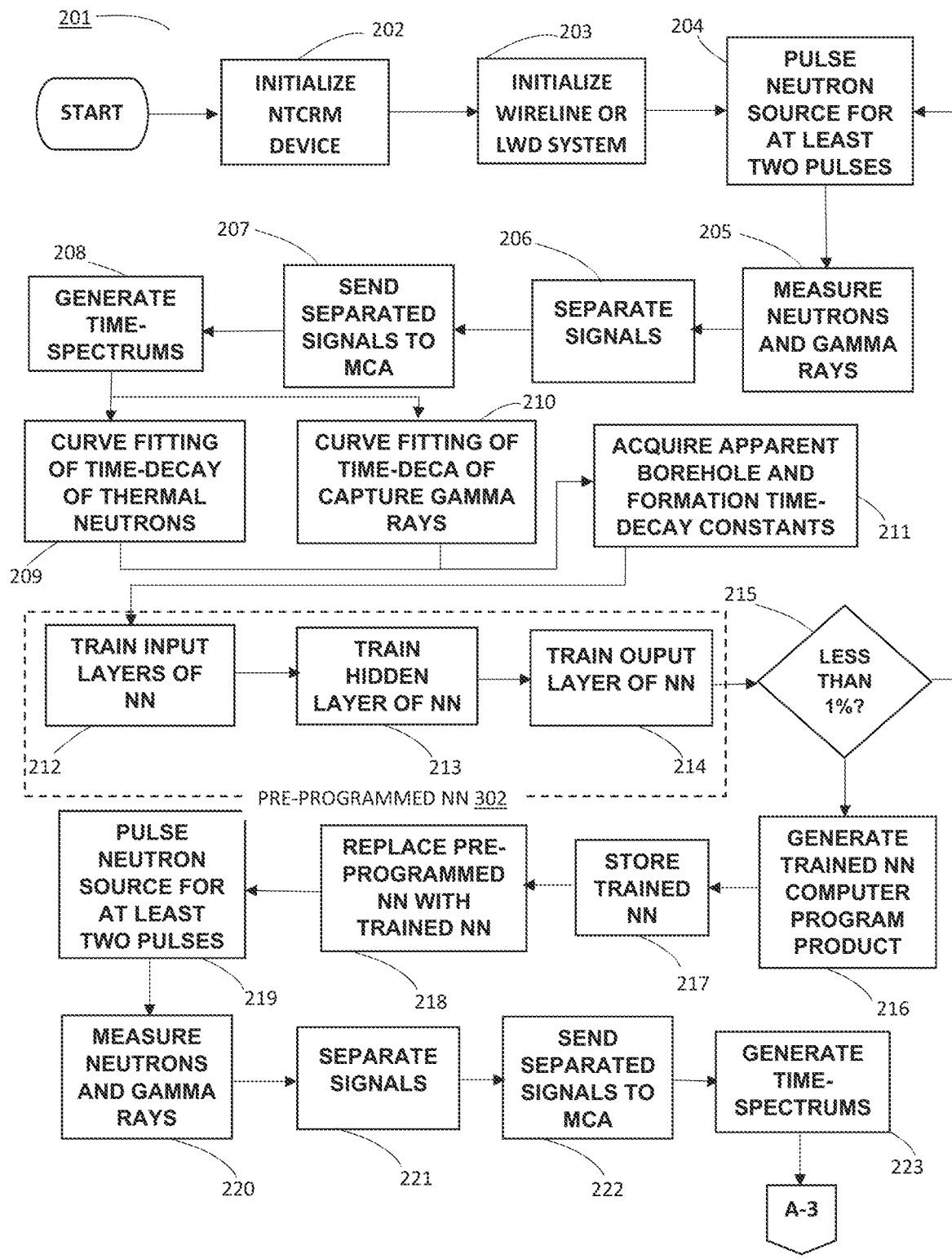
FIG. 2A and FIG. 2B, illustrates a flow chart of the computer-implemented method of using a non-transitory computer readable memory device with a pre-programmed neural network and a trained neural network computer program product both with three layers each, to perform the operations of obtaining a true borehole sigma and a true formation sigma, according to an embodiment of the present disclosure.
Figure 2B:
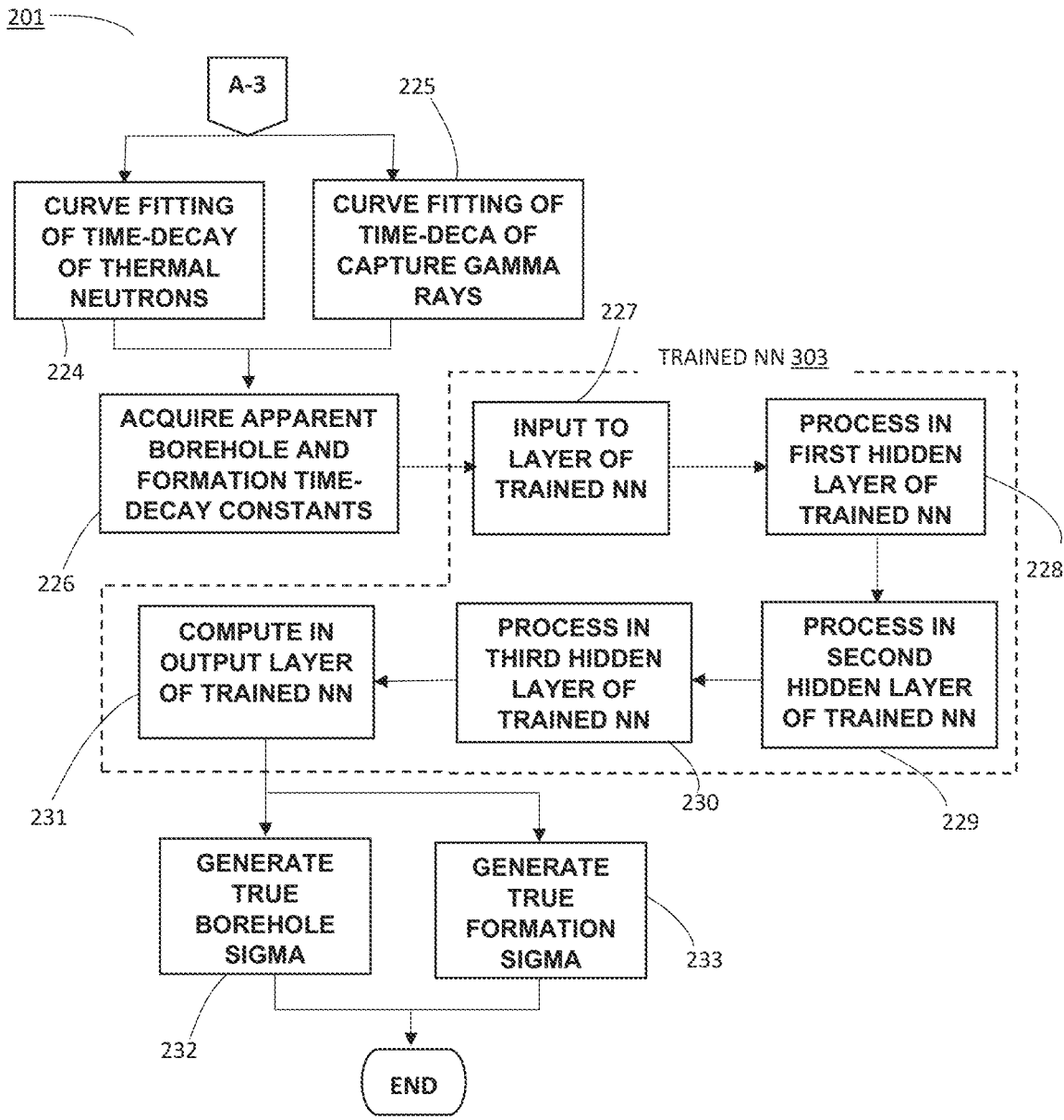

As it pertains to FIG. 2A and FIG. 2B; 201 illustrates a flow chart of the computer-implemented method and instructions used by wireline or LWD tools that incorporate using pulsed neutron sources and multiple dual-function radiation detectors of neutrons and gamma rays each radiation that can be priorly distinguished using pulse shape discrimination techniques in order to generate a borehole sigma and formation sigma using a trained neural network computer program product. Computer-implemented method 201 considers a configuration of a pulsed neutron tool with three dual functional detectors as previously discussed. The thermal neutron count rate time-decay curve and the capture gamma ray count rate time-decay curve obtained at each detector, is processed to obtain two apparent time-decay sigmas (thermal neutron and captured gamma-ray) and two and apparent formation time-decay constant, induced from thermal neutrons and capture gamma rays, all related to an early time-decay component and a later time-decay component. Therefore, six pairs of apparent time-decay constants (($\tau_{bnn}$, $\tau_{fnn}$), ($\tau_{bnf}$, $\tau_{fnf}$), ($\tau_{bnm}$, $\tau_{bnm}$), ($\tau_{bgn}$, $\tau_{fgn}$), ($\tau_{bgm}$, $\tau_{fgm}$), ($\tau_{bgf}$, $\tau_{fgf}$)) can be induced from laboratory measurements or generated from actual in field lithology readings over the survey region, and further utilized with the present method to generate a true borehole sigma ($\Sigma_b$) and a true formation sigma ($\Sigma_f$).

The thermal neutron count rate time-decay curve and the capture gamma ray count rate time-decay curve obtained at each dual-function detector, is also processed to obtain two sets of apparent borehole sigma and apparent formation sigma, induced from thermal neutrons and capture gamma rays, related to an early time-decay component and a later time-decay component, respectively. Therefore, six pairs of apparent sigmas (($\Sigma_{bnn}$, $\Sigma_{fnn}$), ($\Sigma_{bnm}$, $\Sigma_{fnm}$), ($\Sigma_{bnf}$, $\Sigma_{fnf}$), ($\Sigma_{bgn}$, $\Sigma_{fgn}$), ($\Sigma_{bgm}$, $\Sigma_{fgm}$), ($\Sigma_{bgf}$, $\Sigma_{fgf}$)) is induced from laboratory measurements or generated from actual in field lithology readings over the survey region, and further utilized with the present method to generate a true borehole sigma ($\Sigma_b$) and a true formation sigma ($\Sigma_f$).

Particularly, method 201 is a two-part computer-implemented method wherein both subroutines have been incorporated within. These subroutines essentially consist of a blank pre-programmed neural network (NN) to be used with known values to obtain a trained neural network (NN) computer program product. The trained NN computer program product is then the second subroutine which begins when the non-transitory computer readable memory (NT-CRM) device having a pre-programmed neural network is stored to memory resource 603, and then replaced via a message hook procedure on the non-transitory computer readable memory device 605.

Computer-implemented method 201 begins when the non-transitory computer readable memory device having a pre-programmed neural network 605 on an above-surface processing system 109, is initialized at 202. Said initialization occurs also in combination with the initiation 203 of the wireline or LWD system 106, with a neuron pulse by source 111 emitting or pulsing at 204 for at least two pulses at a frequency of at least 500 Hz and a pulse width of at least 20 microseconds. Thereafter, the non-transitory computer readable memory device having a pre-programmed neural network 605 sends a message hook to the neutron source 111 to begin irradiating the sub-surface. The thermal neutrons and neutron-induced gamma rays irradiated by them neuron pulse emitted by source 111, are then measured at 205, using the at least three dual-function radiation detectors 112, 112, and 113. Once all dual-function radiation detectors have measured the emitted thermal neutrons and neutron-induced gamma rays, at 206, the pre-programmed non-transitory computer readable memory device uses pulsed shape discrimination (PSD) technique to separate the signals of thermal neutron and neutron-induce gamma rays from each other. An exemplary separation output of the pre-programmed non-transitory computer readable memory device is illustrated in FIG. 4. The non-transitory computer readable memory device having a pre-programmed neural network 605 sends a message hook to the sub-surface telemetry system 120 to begin transmitting, at 207, the separated signals of neutrons and gamma rays from each detector to the surface telemetry host system 602 so that they can be further processed by a multi-channel analyzer (MCA) embedded within above-surface processing system 109 and connected to the computer system device 608 via the communication bus 604. Once the MCA receives said signal, it generates them at 208 into a histogram, or "time spectrum" of number of events, versus the time of an event arrival, which may often relate to energy or time of arrival, and then stores it to the memory resource 603. The stored spectrum may then be displayed by 610 and analyzed by person having ordinary skills in the art. Once the separated signals have been stored, the non-transitory computer readable memory device having the pre-programmed neural network receives a message hook from the MCA to begin generating a thermal neutron time-spectrum and a capture 'gamma ray time-spectrum for each of the three dual-function radiation detectors, where each thermal neutron time-spectrum essentially consists of a time-decay curve of thermal neutrons, and the neutron-induced capture gamma rays time-spectrum essentially consists of a time-decay curve of neutron-induced capture gamma rays immediately after a neutron pulse.

The non-transitory computer readable memory device having a pre-programmed neural network 605 then begins computing at 209 and 210 the curve-fitting of the time-decay curves of thermal neutrons and capture gamma rays from the generated time spectrums, using two exponential to obtain a neutron-induced apparent borehole time-decay constant, a neutron-induced apparent formation time-decay constant, a gamma-induced apparent borehole time-decay constant, and a gamma-induced apparent formation time-decay constant, for each of the at least three dual-function radiation detectors. The "best fit" to the curves is determined by the non-transitory computer readable memory device having a pre-programmed neural network as well as an algorithm 605 through varying at least five parameters in the fitting function Y(t) so that Y(t) converges as closes as possible to the data. Mathematically, this is accomplished by programming least-squares relative error regression, L, onto the non-transitory computer readable memory device having a pre-programmed neural network as well as an algorithm 605, as follows:

$$L = \sum_{t_i}^{t_f} \left( \frac{Y(t) - C(t)}{C(t)} \right)^2 \tag{6}$$

Where C(t) is the experimental count rate at time t in detector C. The fitting function Y(t) is a two-exponential time decay function expressed as:

$$Y(t) = A_b e^{-\frac{t}{\tau_b}} + A_f e^{-\frac{t}{\tau_f}} + B \tag{7}$$

Where $A_b$ and $A_f$ are constants which may be interpreted as initial amplitudes of the borehole component and the formation component, in the unit of cps. $\tau_b$ and $\tau_f$ is time-decay constant (mean neutron lifetime) of the materials in borehole region and in the formation region, respectively. B represents the background, in the unit of cps.

Thereafter, the non-transitory computer readable memory device having a pre-programmed neural network 605 reads the smaller the value of L and determines that the better Y(t) fits the curve data. Here the function Y(t) contains 5 parameters, $A_b$, $A_f$, $\tau_b$, and $\tau_f$. The "best fit" is determined by the non-transitory computer readable memory device having a pre-programmed neural network 605 by finding the values for these 5 parameters which make L as small as possible. When the function L is minimized, the curve Y(t) will be as close to the data as possible. To determine how small L should be, the non-transitory computer readable memory device having a pre-programmed neural network and algorithm 605 divides the value of L by the number of data points fitted by each detector. This number is then referred in the computer-implemented method as the least-squares relative error per data point and tells the non-transitory computer readable memory device having a pre-programmed neural network and algorithm 605 how the relative error (on average) the fit is away from each data point. The least-squares relative error per data point should be less than 2% for an acceptable fit. Once the non-transitory computer readable memory device having a pre-programmed neural network 605 achieves the acceptable curve-fitting it messages the memory resource 603 to store said curve fitting of time-decay of thermal neutrons 209 and said curve fitting of time-decay of capture gamma rays 210.

Figure 5A:
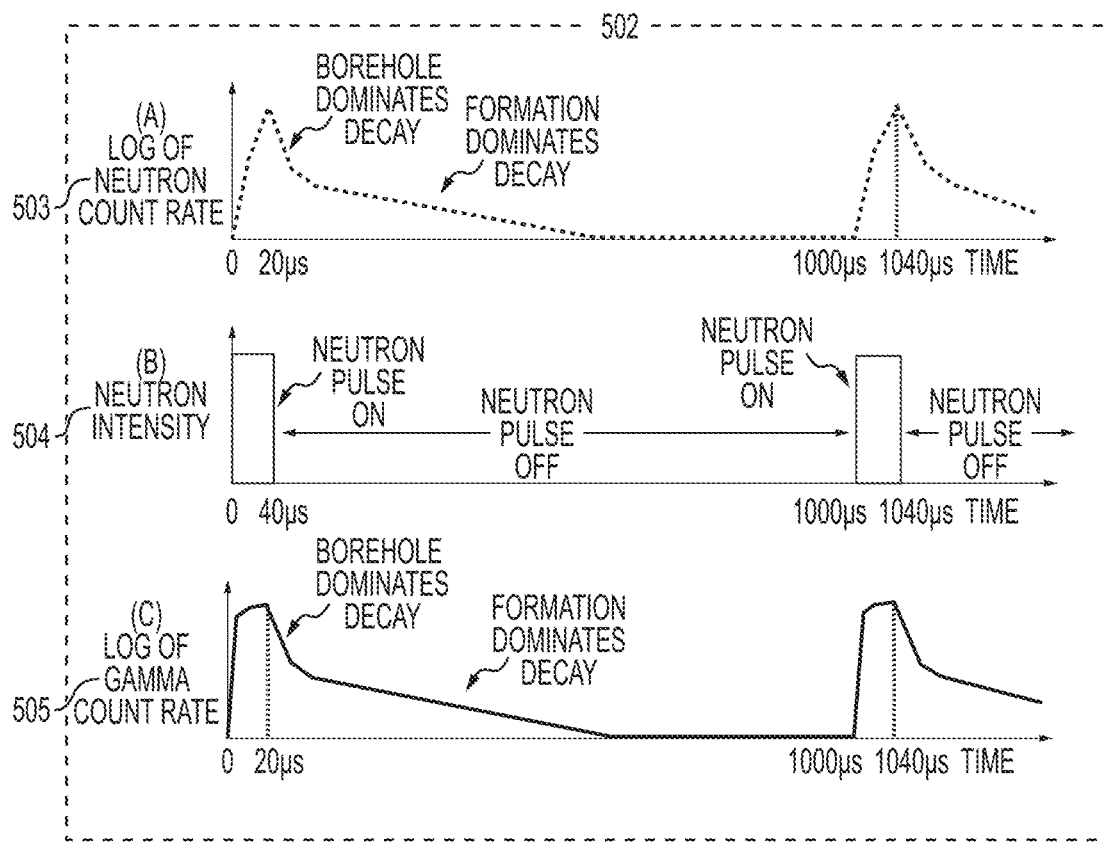
FIG. 5A, FIG. 5B, FIG. 5C, illustrates a thermal neutron count rate decay curve, a neutron intensity, as well as a gamma ray count rate decay curve, for each of the at least three dual-function detectors, according to an embodiment of the present disclosure.
Figure 5B:
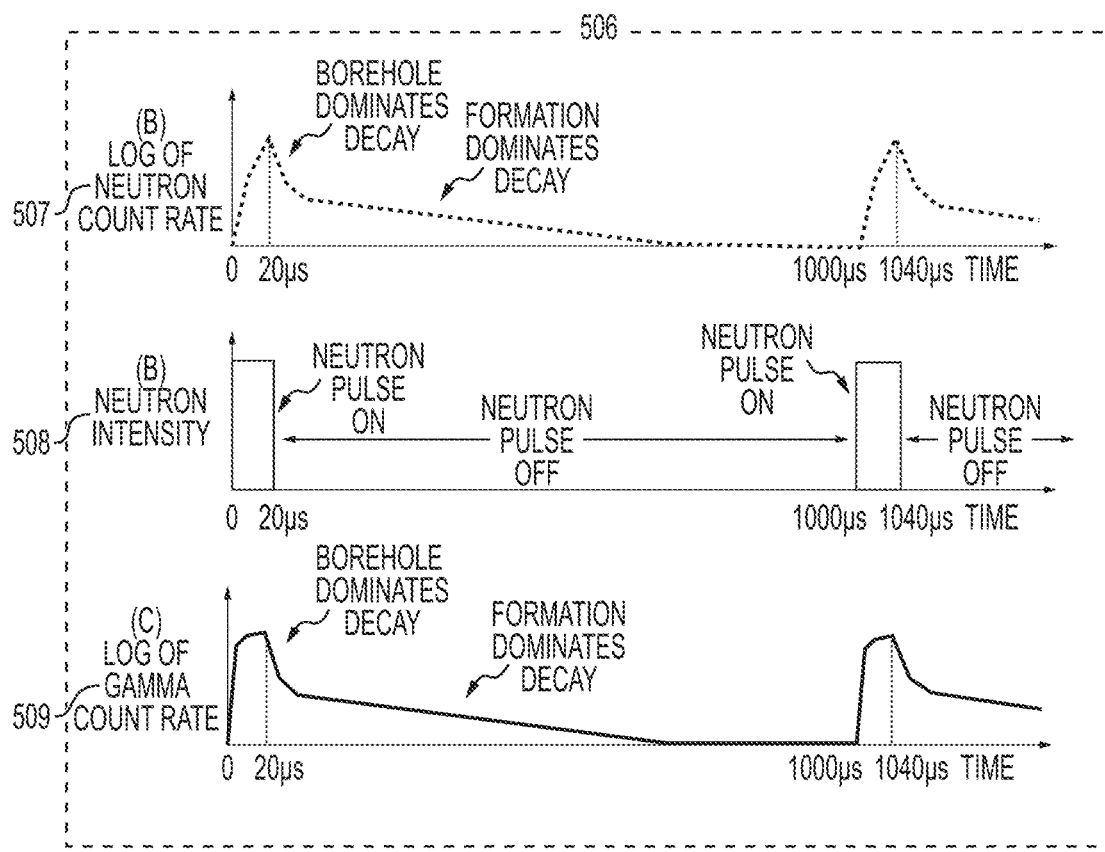
Figure 5C:
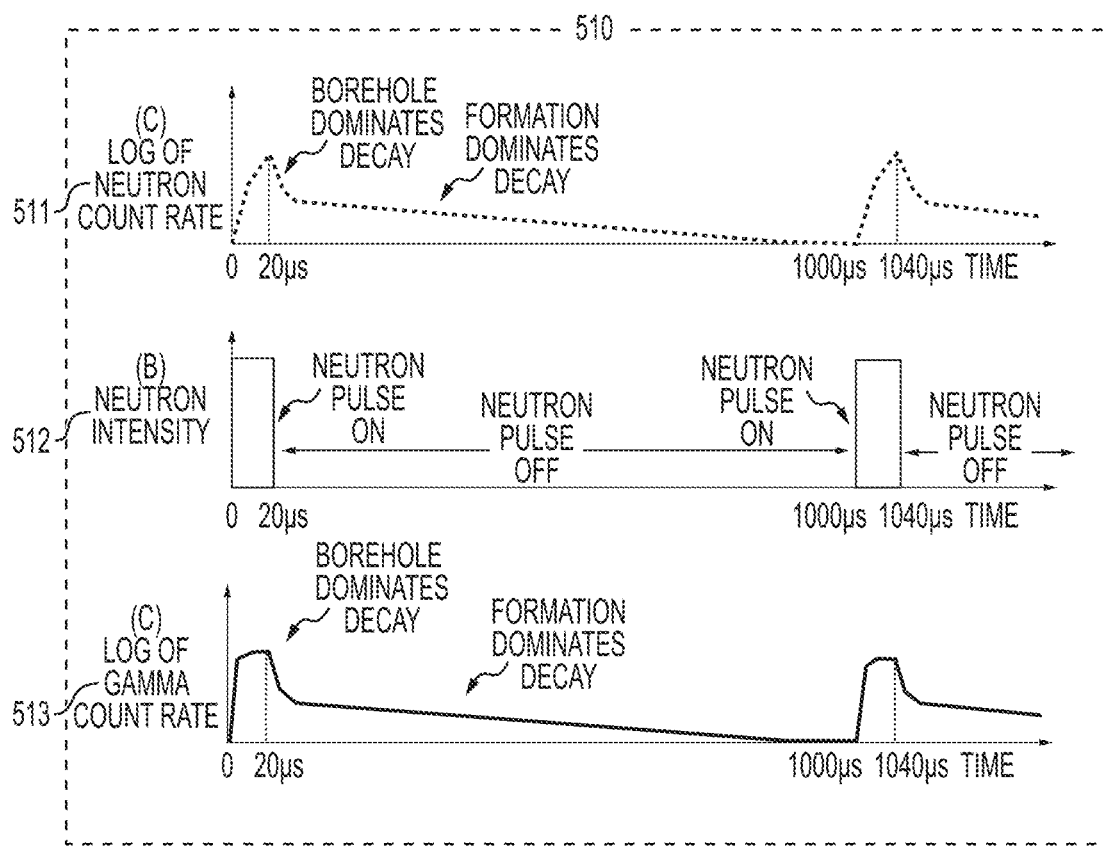

As it is illustrated in FIG. 5A, FIG. 5B, and FIG. 5C, the time decay curves from the near detector 502, the middle detector 506, and the far detector 510 are similar but not exactly same. Specifically, the magnitude of signal is the highest from the near detector (FIG. 5A) and the lowest from the far detector (FIG. 5C), this is due to the fluence rate of thermal neutrons or capture gamma rays decreases with the distance from the source. Secondly, the slope of formation time decay is the steepest for the near detector and the lowest for the far detector. This is due to the thermal neutron diffusion effect has more impact on the decay curve for the near detector than for the far detector. The reason is that the higher the thermal neutron fluence rate is given by a higher diffusion effect that will be found on both thermal neutron time decay and capture gamma ray time decay. As it is observed in 502 and 510 the thermal neutron fluence rate is the highest at the near detector and the lowest at the far detector, respectively.

Using the non-transitory computer readable memory device having a pre-programmed neural network 605, the thermal neutron time-decay curves are further processed at 211 to acquire a neutron-induced apparent borehole time-decay constant, and an neutron-induced apparent formation time-decay constant for each of the at least three dual-function radiation detectors which are assigned the following nomenclature one for each of the at least three dual-function radiation detector, depending upon their position (i.e. near, middle, and far) $\tau_{bnn}$, $\tau_{bnm}$, $\tau_{bnf}$, $\tau_{fnn}$, $\tau_{fnm}$, $\tau_{fnf}$. The capture gamma ray time-decay curves are further processed at 211 to acquire a gamma-induced apparent borehole time-decay constant, and a gamma-induced apparent formation time-decay constant for each of the at least three dual-function radiation detectors which are assigned the following nomenclature one for each of the at least three dual-function radiation detector, depending upon their position (i.e. near, middle, and far) $\tau_{bgn}$, $\tau_{bgm}$, $\tau_{bgf}$, $\tau_{fgn}$, $\tau_{fgm}$, $\tau_{fgf}$. Thereafter, with the inputs already gathered as well as known outputs, the non-transitory computer readable memory device having a pre-programmed neural network 605, will message the rest of the system to pause any further collection of data until it has been trained. As such, the first step in training the non-transitory computer readable memory device having a pre-programmed neural network 605, providing a set of input values to the input layer 3021 of FIG. 3. The outputs 3231 and 3232 of the output layer 3204 are compared to known values of borehole sigma and formation sigma corresponding to the set of input values for the sample. The input values and output values can be either experimental values or theoretical values from an experimental data-calibrated tool model. In the training phase 302, this is done for a set of samples called the "training set and the weights at each of the processors is adjusted to improve a match between the outputs 3231 and 3232 and the known borehole sigma and formation sigma values for each set of input values in the training set. The training process is terminated when convergence is reached. Convergence is reached when the incremental change in the weights is very small, or the differences between the outputs and true values are very small. The middle layer of the non-transitory computer readable memory device having a pre-programmed neural network 605 is the hidden layer, as observed by 3023 which may contain at least three additional hidden layers (also referred to as deep neural network system). The processors in each of the aforementioned middle layers are weighted from nonlinear regressions to linear regressions, depending upon the depth of the hidden layers. The training of the non-transitory computer readable memory device having a pre-programmed neural network 605 first layer at 212 considers the acquired neutron-induced apparent borehole time-decay constant, the acquired neutron-induced apparent formation time-decay constant, the acquired gamma-induced apparent borehole time-decay constant, and the gamma-induced apparent formation time-decay constant for each node 3210, 3211, 3212, . . . , 3213. Thereafter, the non-transitory computer readable memory device having a pre-programmed neural network 605 sends those inputs to the hidden layers to begin processing them at 213 through the different regression algorithms. Particularly, the non-transitory computer readable memory device having a pre-programmed neural network 605 processes, within its first hidden layer the apparent time-decay borehole constant according to expression:

$$\tau_b = \left(\sum_{i=1}^{12} w_i \sqrt[n]{X_i}\right)^n \qquad (8)$$

Furthermore, in the same first hidden layers the non-transitory computer readable memory device having a pre-programmed neural network 605 also processes the apparent formation time-decay constant according to expression:

$$\tau_f = \sqrt[n]{\sum_{i=1}^{12} w_i X_i^n} \qquad (9)$$

Where $w_i$ is weight, and $X_i$ is apparent borehole time-decay constant, or the apparent formation time-decay constant in input layer, i=1, 2, 3, . . . 12, and n=3. Similarly, the second hidden layer of the non-transitory computer readable memory device having a pre-programmed neural network 605 continues the processing of the input values using nonlinear regressions, particularly according to the following expression for the apparent borehole time-decay constant:

$$\tau_b = \left(\sum_{i=1}^{12} w_i \sqrt[n]{Y_i}\right)^n \qquad (10)$$

And according to the following expression for the apparent formation time-decay constant:

$$\tau_f = \sqrt[n]{\sum_{i=1}^{12} w_i Y_i^n} \qquad (11)$$

Where $w_i$ is weight, and $Y_i$ is apparent borehole time-decay constant node values, apparent formation time-decay constant node values in layer 1, i=1, 2, 3, . . . 12, and n=2. By this point, the non-transitory computer readable memory device having a pre-programmed neural network 605 will have detected that the amount of nodes available in comparison to the data inputs is not different, or insufficient, and would then switch to the its third layer to train in accordance to a simple linear regression algorithm, where $w_i$ is weight, and $Z_i$ is apparent borehole time-decay constant node values, apparent formation time-decay constant node values in hidden layer 2, and i=1, 2, 3, . . . 12:

$$\tau_b \text{ or } \tau_f = \Sigma_{i=1}^{12} w_i Z_i \qquad (12)$$

Then, the non-transitory computer readable memory device having a pre-programmed neural network 605 sends the computed nonlinear and linear values of the apparent borehole time-decay constant, and that of the apparent formation time-decay constant to the output layer 3024 to begin generating the true borehole and true formation sigmas. The non-transitory computer readable memory device having a pre-programmed neural network 605 does this in accordance to certain pre-programmed algorithms Where $w_j$, $w_k$ are weight, $U_j$ is the apparent borehole time-decay constant node values in the hidden layer 3, $U_k$ is the apparent formation time-decay constant node values in hidden layer 3, j=1, 2, 3, . . . 6, and k=1, 2, 3, . . . 6. In fact, the algorithm processed by the non-transitory computer readable memory device having a pre-programmed neural network 605 to generate a true borehole sigma is:

$$\Sigma_b = 4.55 \times 10^3 / \Sigma_{j=1}^6 w_j U_j \tag{13}$$

Similarly, the algorithm for the true formation sigma used by the non-transitory computer readable memory device having a pre-programmed neural network 605 is:

$$\Sigma_f = 4.55 \times 10^3 / \Sigma_{k=1}^6 U_k \tag{14}$$

Nonetheless, training of the non-transitory computer readable memory device having a pre-programmed neural network 605 is not completed at step 214 because it still needs to compare the relative difference between an output ($\Sigma_b$ or $\Sigma_f$) of the third layer to the known values of a true borehole sigma and a true formation sigma. While comparing these values, the non-transitory computer readable memory device having a pre-programmed neural network 605 will evaluate whether the difference is less than 1 percent, and if not, it will send a message hook at 215 to reinitiate the process from step 204. The non-transitory computer readable memory device having a pre-programmed neural network 605 will consider the iteration complete upon successfully achieving a relative difference of less than 1 percent. Once said non-transitory computer readable memory device having a pre-programmed neural network 605 achieves said relative different, the weights are kept fixed, and a plurality of samples called "test sets" are further processed using the non-transitory computer readable memory device having a pre-programmed neural network 605 with the fixed weights. If a good agreement is observed between predicted and actual borehole sigma and formation sigma values in the test sets, then the neural network is considered to have been well-trained, and the trained neural network computer program product is generated at 216, then stored at 217 to a memory resource 603 and later replaced or installed at 218 in either the electronic systems of the bottom hole assembly (BHA) 106 or data processing system on the above-surface system 109 for use during logging or drilling operations. If good agreement is not noted in the test sets between the neural network outputs and the actual true borehole sigma and the true formation sigma, then further training is carried out which involves repeating the steps 204 through 215.

Upon replacing the pre-programmed neural network with the trained neural network on the non-transitory computer readable memory device, it has now become a non-transitory computer readable memory device having a trained neural network computer program product 605. Said 605 messages the neutron pulse source 111 of 106 to pulsing the deuterium-tritium (D-T) neutron generator or the deuterium-deuterium (D-D) neutron generator neutron source, for at least two pulses at 219. Said pulses generate signals that are measured neutrons and neutron-induced gamma rays for at least three dual-function radiation detectors at step 220. Given by the fact at this stage the neural network has been trained, the input data become the actual measured neutrons and neutron-induced gamma rays after each of the at least two pulses from each of at least three dual-function radiation detectors. Signals of the measured neutrons and neutron-induced gamma rays still need to be separated at 221 into thermal neutrons and neutron-induced capture gamma rays by the sub-surface electronics 119 having a non-transitory computer-readable memory device using pulsed shape discrimination technique. Because all of this separation is happening sub-surface at the BHA 106, the sub-surface telemetry system 120 sends a message hook to the above-surface telemetry system 602 that it is beginning to transmit, at 222, the separated signals of neutrons and gamma rays from each detector so that they can be further processed by a multi-channel analyzer (MCA) embedded within above-surface processing system 109 and connected to the computer system device 608 via the communication bus 604. Once the MCA receives said signal, it generates them at 223 them into a histogram, or "time-spectrum" of number of events, versus the time of arrival and then stores it to the memory resource 603. The stored time spectrum may then be displayed by 610 and analyzed by person having ordinary skills in the art. Once the separated signals have been stored, the non-transitory computer readable memory device having the trained neural network computer program product receives a message hook from the MCA to begin generating a thermal neutron time-spectrum and a capture gamma rays time-spectrum for each of the three dual-function radiation detectors, where each thermal neutron time-spectrum essentially consists of a time-decay curve of thermal neutrons, and the neutron-induced capture gamma rays time-spectrum essentially consists of a time-decay curve of neutron-induced capture gamma rays, immediately after a neutron pulse.

The non-transitory computer readable memory device having a trained neural network computed product 605 then receives a message hook form the MCA to begin computing at 224 and 225 the curve-fitting of the generated time-spectrums, using two exponential decays to fit the time-decay curve of thermal neutrons and the decays the time-decay curve of capture gamma rays. The "best fit" to the curves is determined by the non-transitory computer readable memory device having a trained pre-programmed neural network computer product 605 in the same manner as it was previously done while the NN had not been trained.

Using the non-transitory computer readable memory device having a trained neural network computer program product 605, the time-decay curves are further processed at 226 to acquire a neutron-induced apparent borehole time-decay constant, and an apparent formation time-decay constant for each of the at least three dual-function radiation detectors which are assigned the following nomenclature one for each of the at least three dual-function radiation detector, depending upon their position (i.e. near, middle, and far) $\tau_{bnn}, \tau_{bnm}, \tau_{bnf}, \tau_{fnn}, \tau_{fnm}, \tau_{fnf}$. The capture gamma ray time-decay curves are further processed at 226 to acquire a gamma-induced apparent borehole time-decay constant, and a gamma-induced apparent formation time-decay constant for each of the at least three dual-function radiation detectors which are assigned the following nomenclature one for each of the at least three dual-function radiation detector, depending upon their position (i.e. near, middle, and far) $\tau_{bgn}, \tau_{bgm}, \tau_{bgf}, \tau_{fgn}, \tau_{fgm}, \tau_{fgf}$. Thereafter, with the inputs already gathered, the non-transitory computer readable memory device having a trained neural network computer program product 605, will being processing them. As such, the first step in processing the input values using the trained neural network computer program product involves inputting at 227 the set of input values acquired at 224 to the input layer 3031 of FIG. 3. The trained neural network computer program product then processes at 228 in one of its three, second-processing hidden layers 3033, the acquired neutron-induced apparent borehole time-decay constant and the acquired apparent formation time-decay constant for each of the at least three dual-function radiation detectors using the weighted nonlinear regression algorithm (8 and 9). Thereafter, it continues processing the acquired time-decay constants through its second of the three hidden layers using the weighted nonlinear regression algorithm (10 and 11) at 229. It then processes at 230 in its third of the three, second-processing hidden layers the acquired neutron-induced apparent borehole time-decay constant and the acquired apparent formation time-decay constant for each of the at least three dual-function radiation detectors, but this time using the weighted linear regression algorithm (12). Once all time-decay constants have been processed through all three hidden layers. After successfully completing the processes of the three hidden layers, the pre-programmed non-transitory computer-readable memory device having a trained neural network computer program product 605 will begin computing in the third output-layer 3034 of the non-transitory computer readable memory device having the trained neural network computer program product, a true borehole sigma 3331 and a true formation sigma 3332 using the weighted linear regression algorithms (13, 14). Thereafter the pre-programmed non-transitory computer-readable memory device having a trained neural network computer program product 605 will generate at 232 a true borehole sigma and a true formation sigma as well as message the memory resource 603, to begin the storage of said generated 232 true borehole sigma and a true formation sigma, which upon successfully completing the storing process, it will signal the pre-programmed non-transitory computer-readable memory device having a trained neural network computer program product 605 to display on computer system device 608 external monitor 610 the two aforementioned sigmas. All said sigmas are assigned by the pre-programmed non-transitory computer-readable memory device having a trained neural network computer program product 605 respective nomenclatures, depending upon the position (i.e., near, middle, and far) of the detectors within the BHA section 106.

Thereafter, the memory resource device 603 will receive a message hook from the non-transitory computer readable memory device 605 that it can send the information, data, constants, variables, and sigmas to the computer system device 608 so that it can be display on 610 as well as printed using 613.

Figure 3:
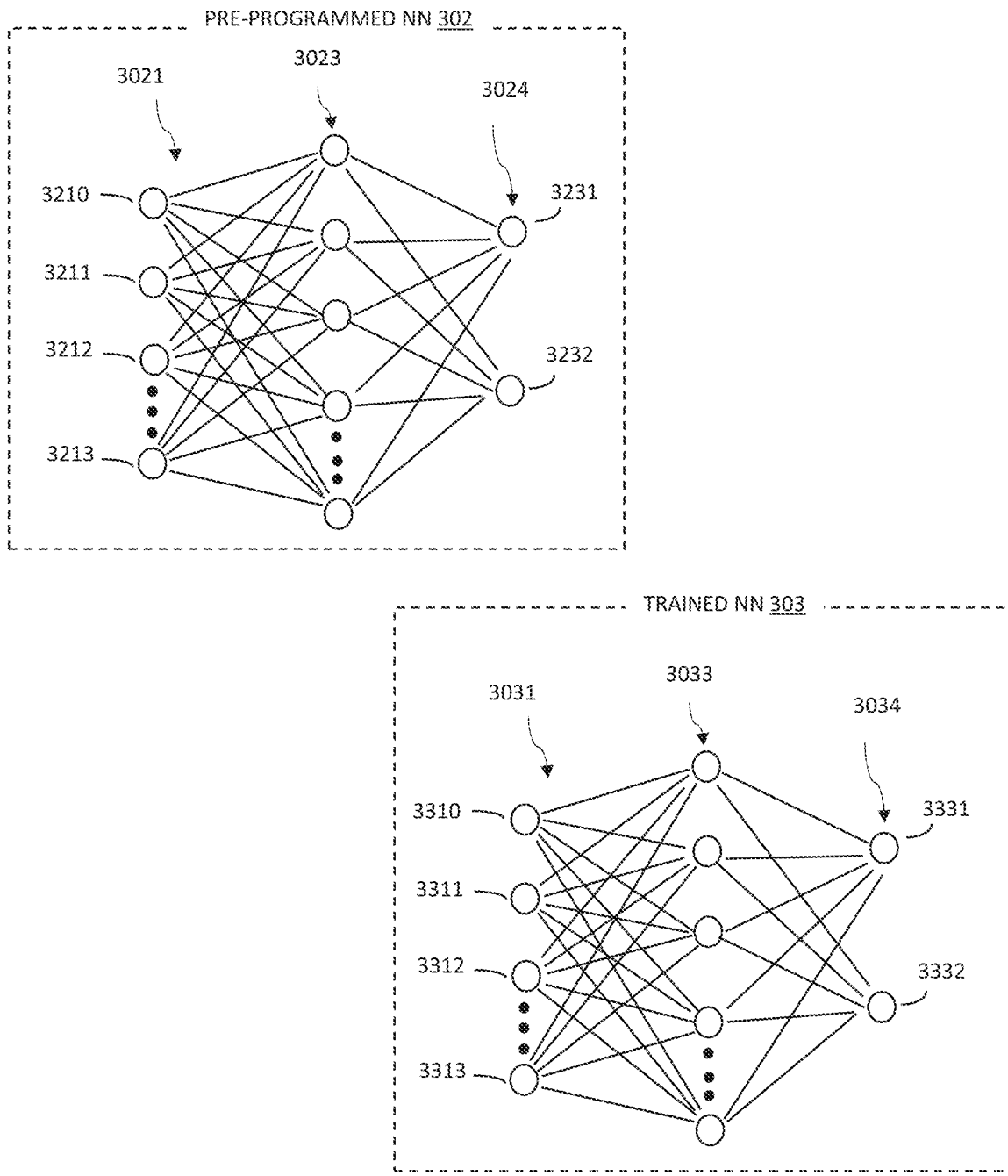
FIG. 3, illustrates the trained neural network computer program product used to obtain the true borehole sigma and true formation sigma (or true borehole time-decay constant and true formation time-decay constant) by using apparent borehole sigma and apparent formation sigma (or apparent borehole time-decay constant and apparent formation decay constant) from three detectors

As shown in FIG. 3 two neural networks are shown. 302 is the pre-programmed or blank neural network, while 303 is the trained neural network having all weights fixed. Each neural network is shown having a single hidden layer 3023 or 3033, with multiple processors but due to drawing constraints, but said layers actually consist of a deep neural network layer of at least three hidden layers. The input layers 3021 and 3031 include a number of processors depicted by 3210, 3310, 3211, 3311, 3212, 3312, and . . . , 3213, 3313. The input to the input layer may also include measurements such as the size of the borehole, the standoff of the tool from the borehole wall, formation mineralogy, salinity of the borehole fluid, salinity of the formation fluid, density of the borehole fluid, temperature of the borehole fluid, temperature of the formation, pressure of the borehole fluid, formation pore pressure, etc. The list is not intended to be complete and, as noted above, some of the measurements may be made during the drilling process while other measurements may be a priori from knowledge of the subsurface or from previously drilled boreholes. The output layers 3024 and 3034 each show two separate processors for computing the true borehole sigma 3231, 3331, and the true formation sigma 3232, and 3332. In the example shown, the processors of the output layers 3024 and 3034 provide a weighted combination of the outputs of each of the outputs of the processors of the hidden layers. The output of each of the processors in hidden layer is a weighted linear regression combination of each of the outputs of the processors 3210, 3310, 3211, 3311, 3212, 3312, and . . . , 3213, 3313 of the input layers which may be the measurements or may be a function of the measurements.

As it pertains to FIG. 4, it illustrates in graphical forms 401 how the pulse shape discrimination (PSD) technique that is pre-programmed in the non-transitory computer readable memory device of the at least three dual-function radiation detectors, are able separate between neutron and gamma rays. Particularly, by coupling and using two scintillators comprising $Cs_2LiYCl_6$(CLYC) and $Cs_2LiLaBr_6$ (CLLB) crystals, which are sensitive to both neutrons and gamma rays to a scintillation-light-sensitive-component, such as a photomultiplier tube (PMT), the at least three dual-function radiation detectors can effectively detect both neutrons and gamma rays individually as an electronic signal from a gamma ray decays faster than a neutron, shown in 402 and 403.

On the other hand, FIG. 5A, FIG. 5B, FIG. 5C, illustrate in 501 a thermal neutron count rate decay curve, a neutron intensity, as well as a gamma ray count rate decay curve, for the near dual-function radiation detector 502 for the middle dual-function radiation detector 506, and for the far dual-function radiation detector 510. The frequency of neuron pulse used is of at least 500 Hz, with a pulse width of at least 20 microseconds for each of the three dual-function radiation detectors and represented by 504 (near detector), 508 (middle detector), and 512 (far detector). The thermal neutron count rate decay curve is illustrated for each of the at least three dual-function radiation detectors and represented by 503 (near detector), 507 (middle detector), and 511 (far detector). The capture gamma ray count rate decay curve from each of the three detectors is shown by 505 (near detector), 509 (middle detector), and 513 (far detector). Borehole decay dominates in the early time whereas formation decay dominates in the later time after each neutron pulse (during the time between neutron pulses).

Figure 6:
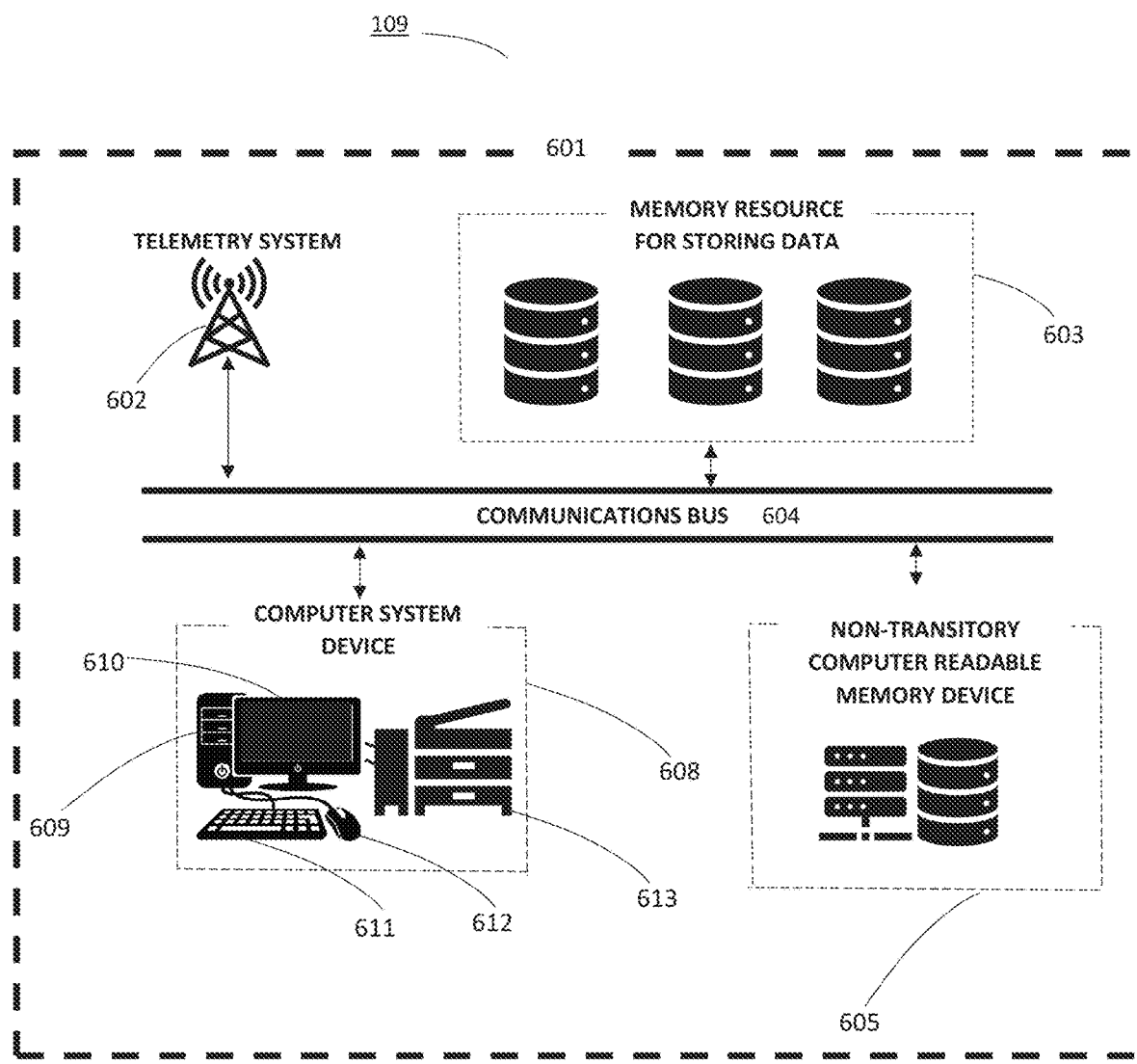
FIG. 6 is an electric diagram, in block form of an application server with a computing program product embodied in a non-transitory computer readable device, used in a distributed network to store instructions for performing, by a device, a method for obtaining near-wellbore true borehole sigma and true formation sigma by using a nuclear logging tool during oil and gas exploration, according to an embodiment of the present disclosure.

In fact, as it pertains to FIG. 6, the pre-programmed non-transitory computer-readable memory device on an above-surface processing system is part of a computing system device 601 which is shown to compile the information from the various application servers that are placed within the above-surface processing system 109. Said computing system device 601 on an above-surface processing system 109 is shown typically comprising a telemetry system 602, a memory resource for storing data 603, a communication bus 604, a non-transitory computer-readable memory device 605, and a computer system device that is used as a user-interface, 608. Th pre-programmed non-transitory computer-readable memory device 605, illustrated as a functional block diagram performs an array of operations and instructions for the computer-implemented method that uses pulsed neutron sources and multiple dual-function radiation detectors of neutrons and gamma rays that can be priorly distinguished using pulse shape discrimination techniques in order to measure thermal neutron time-decay signals and thermal neutron capture gamma ray time-decay signals to obtain borehole sigma and formation sigma.

The memory resource 603 may include any of various forms of memory media and memory access devices. For example, memory devices 603 may include semiconductor RAM and ROM devices as well as mass storage devices such as CD-ROM drives, magnetic disk drives, and magnetic tape drives.

The computer system device, 608, acts as a user interface the non-transitory computer readable device, 605 to input, set, setup, select, and perform the operations of extracting, storing, processing, computing, generating, retrieving, interpolating, and repeating, (collectively the message hook procedures). Said computer system device, 608, is connected to (wired and/or wirelessly) through a communication device 604 to the above surface telemetry system 109, to the memory resource 603, and to the non-transitory computer readable memory device 605. The computer system device, 608, further includes other devices like a central processing unit (CPU), 609, a display or monitor, 610, a keyboard, 611, a mouse, 612, and a printer, 613. One or more users may supply input to the pre-programmed non-transitory computer-readable memory device on an above-surface processing system through the set of input devices of the computing system like 611 or 612. Nevertheless, a person having ordinary skills in the art will soon realize that input devices may also include devices such as digitizing pads, track balls, light pens, data gloves, eye orientation sensors, head orientation sensors, etc. The set of output devices 610 and 613 may also include devices such as projectors, head-mounted displays, plotters, etc.

In one embodiment of the pre-programmed non-transitory computer-readable memory device on an above-surface processing system, it may include one or more communication devices (communications bus) 604, like network interface cards for interfacing with a computer network. For example, seismic data gathered at a remote site or below surface, may be transmitted to the pre-programmed non-transitory computer-readable memory device on an above-surface processing system using a telemetry system 602, through a computer network. The pre-programmed non-transitory computer-readable memory device on an above-surface processing system may also receive seismic data, coordinates, elements, source, and receiver information from an external computer network using the communication's bus 604 network interface card, in addition to that data received from the wireline or LWD tool 106. In other embodiments, the pre-programmed non-transitory computer-readable memory device on an above-surface processing system may include a plurality of computers and/or other components coupled over a computer network, where storage and/or computation implementing embodiments of the present may be distributed over the computers (and/or components) as desired.

The pre-programmed non-transitory computer-readable memory device on an above-surface processing system, has a firmware, a kernel and a software providing for the connection and interoperability of the multiple connected devices, like the telemetry system 602, the memory resources for storing data, 603, the communication bus 604, the non-transitory computer readable device, 605, and the computer system device, 608. The pre-programmed non-transitory computer-readable memory device on an above-surface processing system includes an operating system, a set of message hook procedures, and a system application.

Furthermore, because performance and computation costs are always an important issue, the pre-programmed non-transitory computer-readable memory device on an above-surface processing system, uses the non-transitory computer readable device, 605 to ensure that the steps of the computer-implemented method 201 will not be bottlenecked by all its I/O, or any other network communications. In fact, file-distribution systems like Apache Hadoop in combination with proper data-compressions, as well as smart file caching according to the data will ensure that the operations or instructions performed at 201; are only limited by the memory/cache speed and CPU/GPU computing power, and nothing else.

The operating system embedded within the computing system device 601 as well as the pre-programmed non-transitory computer-readable memory device 605, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of the pre-programmed non-transitory computer-readable memory device 605 may, for example, represent an operation or command of the telemetry system 602, the memory resources, 603, or the computer system device, 608, which may be currently executing a certain step process or subroutines from the computer-implemented method 201.

The set of message hook procedures may be first initiated by: (i) an input from a user, which will typically be a person having ordinary skills in the art, like the entering of user-defined values or parameters; (ii) the manipulation of the computer system device, 608; (iii) the processing of operations in the non-transitory computer readable memory device, 605; or (iv) automatically once certain data has been stored or retrieved by either the memory resources, 603, or the non-transitory computer readable memory device, 603. Based on any of these inputs, processes or manipulation events, the memory resource, 603, the non-transitory computer readable memory device, 605, or the computer system device, 608; generate a data packet that is passed using the communication bus, 604, which are indicative of the event that has occurred as well as the event that needs to occur. When either the memory resource, 603, the non-transitory computer readable device, 605, or the computer system device, 608, receive the data packet, they convert it into a message based on the event, and executes the required operations or instruction of 201. This is achieved when the operating system examines the message hook list and determines if any message hook procedures have registered themselves with the operating system before. If at least one message hook procedure has registered itself with the operating system, the operating system passes the message via the communication bus 604 to the registered message hook procedure that appears first on the list. The called message hook executes and returns a value to either the memory resource, 603, the non-transitory computer readable memory device, 605, or the computer system device, 608, instructing them, to pass the message to the next registered message hook, and either the memory resource, 603, the non-transitory computer readable memory device, 605, or the computer system device, 608. The pre-programmed non-transitory computer-readable memory device 605, continues executing the operations until all registered message hooks have passed, which indicates the completion of the operations or instruction 201, by the generation and storing of a set of final spatial varying wavelets, to the memory resource, 603.

The non-transitory computer readable device, 605, is configured to read and execute program instructions, e.g., program instructions provided on a memory medium such as a set of one or more CD-ROMs and loaded into semiconductor memory at execution time. The non-transitory computer readable device, 605 may be coupled wired or wireless to memory resource 603 through the communication bus 604 (or through a collection of busses). In response to the program instructions, the non-transitory computer readable memory device, 605 may operate on data stored in one or more memory resource 603. The non-transitory computer readable memory device, 605 may include one or more programmable processors (e.g., microprocessors).

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

| Symbols Table | | | |
|---|---|---|---|
| Symbol | Brief Definition | Symbol | Brief Definition |
| $\Sigma_b$ | true macroscopic thermal neutron capture cross-section (sigma) of borehole | t | time |
| $\Sigma_f$ | true macroscopic thermal neutron capture cross-section (sigma) of formation | c.u. | capture unit, $1/1000$ of $1/cm$ |
| v | thermal neutron speed | R | universal gas constant |
| B | background count rate | M | molecular weight of neutron |
| $\sigma$ | thermal neutron capture cross-section | $v_p$ | the most probable speed of neutrons |
| $\rho$ | density of material | K | kinetic energy of neutron |
| $N_A$ | Avogadro number | $\Sigma_{bnn}$ | apparent borehole sigma obtained from neutron decay of the near detector |
| A | atomic weight of an element | $\Sigma_{fnn}$ | apparent formation sigma obtained from neutron decay of the near detector |
| C(t) | count rate of detector at time t | $\Sigma_{bnm}$ | apparent borehole sigma obtained from neutron decay of the middle detector |
| $\Sigma_{bnn}$ | apparent borehole sigma obtained from neutron decay of the near detector | $\Sigma_{bgf}$ | apparent borehole sigma obtained from gamma ray decay of the far detector |
| $\Sigma_{fnn}$ | apparent formation sigma obtained from neutron decay of the near detector | $\Sigma_{fgf}$ | apparent formation sigma obtained from gamma ray decay of the far detector |
| $\Sigma_{bnm}$ | apparent borehole sigma obtained from neutron decay of the middle detector | $\Sigma_{bgn}$ | apparent borehole sigma obtained from gamma ray decay of the near detector |
| $\Sigma_{fnm}$ | apparent formation sigma obtained from neutron decay of the middle detector | $\Sigma_{fgn}$ | apparent formation sigma obtained from gamma ray decay of the near detector |
| $\Sigma_{bnf}$ | apparent borehole sigma obtained from neutron decay of the far detector | $\Sigma_{bgm}$ | apparent borehole sigma obtained from gamma ray decay of the middle detector |
| $\Sigma_{fnf}$ | apparent formation sigma obtained from neutron decay of the far detector | $\Sigma_{fgm}$ | apparent formation sigma obtained from gamma ray decay of the middle detector |
| $\Sigma_{bn}$ | neutron-induced borehole sigma | $\Sigma_{fn}$ | neutron-induced formation sigma |
| $\Sigma_{bg}$ | gamma-induced borehole sigma | $\Sigma_{fg}$ | gamma-induced formation sigma |
| $\tau_{bnn}$ | apparent borehole neutron mean lifetime obtained from neutron decay of the near detector | $\tau_{bgn}$ | apparent borehole neutron mean lifetime obtained from gamma ray decay of the near detector |
| $\tau_{fnn}$ | apparent formation neutron mean lifetime obtained from neutron decay of the near detector | $\tau_{fgn}$ | apparent formation neutron mean lifetime obtained from gamma ray decay of the near detector |
| $\tau_{bnm}$ | apparent borehole neutron mean lifetime obtained from neutron decay of the middle detector | $\tau_{bgm}$ | apparent borehole neutron mean lifetime obtained from gamma ray decay of the middle detector |
| $\tau_{fnm}$ | apparent formation neutron mean lifetime obtained from neutron decay of the middle detector | $\tau_{fgm}$ | apparent formation neutron mean lifetime obtained from gamma ray decay of the middle detector |
| $\tau_{bnf}$ | apparent borehole neutron mean lifetime obtained from neutron decay of the far detector | $\tau_{bgf}$ | apparent borehole neutron mean lifetime obtained from gamma ray decay of the far detector |
| $\tau_{fnf}$ | apparent formation neutron mean lifetime obtained from neutron decay of the far detector | $\tau_{fgf}$ | apparent formation neutron mean lifetime obtained from gamma ray decay of the far detector |
| $\tau_{bn}$ | neutron-induced borehole time-decay constant | $\tau_{fn}$ | neutron-induced formation time-decay constant |
| $\tau_{bg}$ | gamma-induced borehole time-decay constant | $\tau_{fg}$ | gamma-induced formation time-decay constant |

What is claimed is:

1. A computer-implemented method of using a non-transitory computer readable memory device with a pre-programmed neural network and a trained neural network computer program product both with three layers each, to perform the operations of obtaining a true borehole sigma and a true formation sigma, the operations of the computer-implemented method comprising:

initializing a non-transitory computer readable memory device having a pre-programmed neural network on an above-surface processing system, wherein the above-surface processing system is coupled to a memory resource, an above-surface telemetry system, a communication bus, a multi-channel analyzer, and a computing system device;

initializing a nuclear logging tool wireline or logging-while-drilling system having a deuterium-tritium (D-T) neutron generator or a deuterium-deuterium (D-D) neutron generator neutron source coupled with at least three dual-function radiation detectors, wherein each dual-function radiation detector is pre-programmed through a non-transitory computer-readable memory device using pulsed shape discrimination technique, a high-voltage supplier, a sub-surface telemetry system, an electronic instrument, and a sub-surface non-transitory computer readable memory device;

pulsing the deuterium-tritium (D-T) neutron generator or the deuterium-deuterium (D-D) neutron generator neutron source, for at least two pulses;

measuring neutrons and neutron-induced gamma rays after each of the at least two pulses from each of at least three dual-function radiation detectors;

separating signals of the measured neutrons and neutron-induced gamma rays into thermal neutrons and neutron-induced capture gamma rays, using the at least three dual-function radiation detectors pre-programmed through the non-transitory computer-readable memory device using pulsed shape discrimination technique;

sending the separated signals of thermal neutrons and neutron-induced capture gamma rays to the multi-channel analyzer using the sub-surface telemetry system and using the at least three dual-function radiation detectors pre-programmed through the non-transitory computer-readable memory device;

generating a thermal neutron time-spectrum and a neutron-induced capture gamma rays time-spectrum for each of the three dual-function radiation detectors, wherein the thermal neutron time-spectrum essentially consists of a time-decay curve of thermal neutrons, and the neutron-induced capture gamma rays time-spectrum essentially consists of a time-decay curve of neutron-induced capture gamma rays, using the pre-programmed neural network on an above-surface processing system;

computing curve fitting using two exponential decays of the time-decay curve of thermal neutrons from a time immediately after pulsing the deuterium-tritium (D-T) neutron generator or the deuterium-deuterium (D-D) neutron generator neutron source, using two exponential decays, using the pre-programmed neural network on an above-surface processing system;

computing curve-fitting using two exponential decays of the time-decay curve of neutron-induced capture gamma rays from a time immediately after pulsing the deuterium-tritium (D-T) neutron generator or the deuterium-deuterium (D-D) neutron generator neutron source, using the pre-programmed neural network on an above-surface processing system;

acquiring from the computed curve-fitting of the time-decay curve of thermal neutrons and from the computed curve-fitting of the time-decay curve of neutron-induced capture gamma rays, a neutron-induced apparent borehole time-decay constant, and an apparent formation time-decay constant for each of the at least three dual-function radiation detectors, using the pre-programmed neural network on an above-surface processing system;

training a first input-layer of the non-transitory computer readable memory device having a pre-programmed neural network for using, as input, the acquired neutron-induced apparent borehole time-decay constant and the apparent formation time-decay constant;

training three, second-processing hidden layers of the non-transitory computer readable memory device having a pre-programmed neural network with a weighted nonlinear regression algorithm and a weighted regression algorithm;

training a third output-layer of the non-transitory computer readable memory device having a pre-programmed neural network to output an apparent borehole sigma using a weighted linear regression algorithm and to output an apparent formation sigma using a weighted regression algorithm, and then comparing said outputs of said third layer to known values of a true borehole sigma and a true formation sigma;

repeating the operations of pulsing the deuterium-tritium (D-T) neutron generator or the deuterium-deuterium (D-D) neutron generator neutron source, measuring neutrons and neutron-induced gamma rays, separating signals of the measured neutrons and the measured neutron-induced gamma rays from each other, sending the separated thermal neutrons and neutron-induced capture gamma rays to the multi-channel analyzer, acquiring a neutron-induced apparent borehole time-decay constant and an apparent formation time-decay constant, training of the first layer, training of the three, second-processing hidden layers, and training of the third layer of the non-transitory computer readable memory device having a pre-programmed neural network, until a relative difference between an output of the third layer and the known values of a true borehole sigma and a true formation sigma are less than 1 percent;

generating a trained neural network computer program product, having three layers, using the non-transitory computer-readable memory device having a pre-programmed neural network on an above-surface processing system;

storing the generated trained neural network computer program product having three layers, on a memory resource on the above-surface processing system;

replacing the pre-programmed neural network of the non-transitory computer-readable memory device on an above-surface processing system, with the stored trained neural network computer program product, having three layers;

pulsing the deuterium-tritium (D-T) neutron generator or the deuterium-deuterium (D-D) neutron generator neutron source, for at least two pulses;

measuring neutrons and neutron-induced gamma rays after each of the at least two pulses from each of at least three dual-function radiation detectors;

separating signals of the measured neutrons and neutron-induced gamma rays into thermal neutrons and neutron-induced capture gamma rays, using the at least three dual-function radiation detectors pre-programmed through the non-transitory computer-readable memory device using pulsed shape discrimination technique;

sending the separated thermal neutrons and neutron-induced capture gamma rays to the multi-channel analyzer using the sub-surface telemetry system and using the at least three dual-function radiation detectors pre-programmed through the non-transitory computer-readable memory device;

generating a thermal neutron time-spectrum and a neutron-induced capture gamma rays time-spectrum for each of the three dual-function radiation detectors, wherein the thermal neutron time-spectrum essentially consists of a time-decay curve of thermal neutrons, and the neutron-induced capture gamma rays time-spectrum essentially consists of a time-decay curve of neutron-induced capture gamma rays, using the pre-programmed neural network on an above-surface processing system;

computing curve fitting using two exponential decays of the time-decay curve of thermal neutrons from a time immediately after pulsing the deuterium-tritium (D-T) neutron generator or the deuterium-deuterium (D-D) neutron generator neutron source, using two exponential decays, using the non-transitory computer readable memory device having the trained neural network computer program product;

computing curve-fitting using two exponential decays of the time-decay curve of neutron-induced capture gamma rays from a time immediately after pulsing the deuterium-tritium (D-T) neutron generator or the deuterium-deuterium (D-D) neutron generator neutron source, using the non-transitory computer readable memory device having the trained neural network computer program product;

acquiring from the computed curve-fitting of the time-decay curve of thermal neutrons and from the computed curve-fitting of the time-decay curve of neutron-induced capture gamma rays, a neutron-induced apparent borehole time-decay constant, and an apparent formation time-decay constant for each of the at least three dual-function radiation detectors, using the non-transitory computer readable memory device having the trained neural network computer program product;

inputting into a first input-layer of the non-transitory computer readable memory device having the trained neural network computer program product, the acquired neutron-induced apparent borehole time-decay constant and the acquired apparent formation time-decay constant for each of the at least three dual-function radiation detectors;

processing in one of the three, second-processing hidden layers of the non-transitory computer readable memory device having the trained neural network computer program product, the acquired neutron-induced apparent borehole time-decay constant and the acquired apparent formation time-decay constant for each of the at least three dual-function radiation detectors using the weighted nonlinear regression algorithm;

processing in a second of the three, second-processing hidden layers of the non-transitory computer readable memory device having the trained neural network computer program product, the acquired neutron-induced apparent borehole time-decay constant and the acquired apparent formation time-decay constant for each of the at least three dual-function radiation detectors using the weighted nonlinear regression algorithm;

processing in a third of the three, second-processing hidden layers of the non-transitory computer readable memory device having the trained neural network computer program product the acquired neutron-induced apparent borehole time-decay constant and the acquired apparent formation time-decay constant for each of the at least three dual-function radiation detectors using the weighted linear regression algorithm; and computing in a third output-layer of the non-transitory computer readable memory device having the trained neural network computer program product, a true borehole sigma and a true formation sigma using the weighted linear regression algorithms;

generating a true borehole sigma and a true formation sigma using the weighted linear regression algorithms of the trained third output-layer of the non-transitory computer readable memory device having the trained neural network computer program product.

2. The method of claim 1, wherein processing in one of the three, second-processing hidden layers of the non-transitory computer readable memory device having the trained neural network computer program product, the acquired neutron-induced apparent borehole time-decay constant for each of the at least three dual-function radiation detectors using the weighted nonlinear regression algorithm, further comprises the expression:

$$\tau_b = \left(\sum_{i=1}^{12} w_i \sqrt[n]{X_i}\right)^n.$$

3. The method of claim 1, wherein processing in one of the three, second-processing hidden layers of the non-transitory computer readable memory device having the trained neural network computer program product, the acquired apparent formation time-decay constant for each of the at least three dual-function radiation detectors using the weighted nonlinear regression algorithm, further comprises the expression:

$$\tau_f = \sqrt[n]{\sum_{i=1}^{12} w_i X_i^n}.$$

4. The method of claim 1, wherein processing in a second of the three, second-processing hidden layers of the non-transitory computer readable memory device having the trained neural network computer program product, the acquired neutron-induced apparent borehole time-decay constant for each of the at least three dual-function radiation detectors using the weighted nonlinear regression algorithm, further comprises the expression:

$$\tau_b = \left(\sum_{i=1}^{12} w_i \sqrt[n]{Y_i}\right)^n.$$

5. The method of claim 1, wherein processing in a second of the three, second-processing hidden layers of the non-transitory computer readable memory device having the trained neural network computer program product, the acquired apparent formation time-decay constant for each of the at least three dual-function radiation detectors using the weighted nonlinear regression algorithm, further comprises the expression:

$$\tau_f = \sqrt[n]{\sum_{i=1}^{12} w_i Y_i^n}.$$

6. The method of claim 1, wherein processing in a third of the three, second-processing hidden layers of the non-transitory computer readable memory device having the trained neural network computer program product the acquired neutron-induced apparent borehole time-decay constant and the acquired apparent formation time-decay constant for each of the at least three dual-function radiation detectors using the weighted linear regression algorithm, further comprises the expression:

$$\tau = \sum_{i=1}^{12} w_i Z_i.$$

7. The method of claim 1, wherein generating a true borehole sigma using the weighted linear regression algorithms of the trained third output-layer of the non-transitory computer readable memory device having the trained neural network computer program product, further comprises the expression:

$$\Sigma_b = 4.55 \times 10^3 / \sum_{j=1}^{6} w_j U_j.$$

8. The method of claim 1, wherein generating a true formation sigma using the weighted linear regression algorithms of the trained third output-layer of the non-transitory computer readable memory device having the trained neural network computer program product, further comprises the expression:

$$\Sigma_f = 4.55 \times 10^3 / \sum_{k=1}^{6} w_k U_k.$$

* * * * *